(12) United States Patent  
Forbes et al.

(10) Patent No.: US 8,818,344 B2
(45) Date of Patent: Aug. 26, 2014

(54) SECURED COMMUNICATION VIA LOCATION AWARENESS

(75) Inventors: Scott C Forbes, Seattle, WA (US);
Linda Criddle, Kirkland, WA (US);
David Milstein, Redmond, WA (US);
Lon-Chan Chu, Redmond, WA (US);
Kuansan Wang, Bellevue, WA (US);
Michael D Malueg, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 1408 days.

(21) Appl. No.: 11/599,647

(22) Filed: Nov. 14, 2006

(65) Prior Publication Data

US 2008/0112551 A1    May 15, 2008

(51) Int. Cl.
*H04M 3/42*    (2006.01)
*H04L 9/32*    (2006.01)
*H04W 12/06*   (2009.01)

(52) U.S. Cl.
CPC ...... *H04L 9/32* (2013.01); *H04L 9/321* (2013.01); *H04W 12/06* (2013.01)
USPC ........... 455/415; 709/227; 709/228; 709/229; 455/404.1; 455/404.2; 455/556.1; 370/352; 379/88.19; 379/93.03

(58) Field of Classification Search
None
See application file for complete search history.

(56) References Cited

U.S. PATENT DOCUMENTS

| | | | |
|---|---|---|---|
| 5,757,916 A * | 5/1998 | MacDoran et al. | ........... 380/258 |
| 6,678,357 B2 | 1/2004 | Stumer et al. | |
| 6,771,742 B2 | 8/2004 | McCalmont | |
| 6,904,132 B2 | 6/2005 | Reynolds | |
| 6,925,487 B2 | 8/2005 | Kim | |
| 7,027,564 B2 | 4/2006 | James | |
| 7,984,294 B1 * | 7/2011 | Goringe et al. | ................ 713/166 |
| 2003/0225893 A1 * | 12/2003 | Roese et al. | .................. 709/227 |
| 2005/0090225 A1 | 4/2005 | Muehleisen | |
| 2005/0213565 A1 | 9/2005 | Barclay | |
| 2005/0213716 A1 | 9/2005 | Zhu | |
| 2005/0281284 A1 | 12/2005 | Shim | |
| 2006/0067308 A1 | 3/2006 | Cho | |
| 2006/0072547 A1 | 4/2006 | Florkey | |

(Continued)

FOREIGN PATENT DOCUMENTS

EP    1643740 A1    4/2006

OTHER PUBLICATIONS

Lookabaugh, T., et al., "A Model for Emergency Service of VoIP Through Certification and Labeling," Federal Communications Law Journal 58(1):115-167, 2006.

(Continued)

*Primary Examiner* — Faruk Hamza
*Assistant Examiner* — Andrew Oh
(74) *Attorney, Agent, or Firm* — Steven Spellman; Jim Ross; Micky Minhas

(57) ABSTRACT

A method and system for collecting and verifying the location information of a calling party and a device of the calling party is provided. More specifically, a method and system is provided for determining whether the identity of the calling party can be confirmed, via evaluating location information, with an acceptable degree of certainty. The location information may be provided by the calling party or obtained from various sources over a digital communication channel. Some of the provided location information which can be accidentally or intentionally altered is identified and evaluated to determine its accuracy as part of the verification process of the caller's identity.

20 Claims, 18 Drawing Sheets

(56) References Cited

U.S. PATENT DOCUMENTS

| | | | |
|---|---|---|---|
| 2006/0106944 A1* | 5/2006 | Shahine et al. | 709/245 |
| 2006/0293024 A1* | 12/2006 | Benco et al. | 455/404.2 |
| 2007/0058637 A1* | 3/2007 | Lo | 370/395.2 |
| 2007/0213092 A1* | 9/2007 | Geelen | 455/556.1 |
| 2008/0101552 A1* | 5/2008 | Khan et al. | 379/45 |
| 2010/0304707 A1* | 12/2010 | Bolin | 455/404.2 |

OTHER PUBLICATIONS

Mintz-Habib, M., et al., "A VoIP Emergency Services Architecture and Prototype," Proceedings of the IEEE In't Conference on Computer Communications and Networks, San Diego, CA, Oct. 17-19, 2005, pp. 523-528.

TCN Users' Manual [online], uploaded on Oct. 5, 2004 <http://www.scmaonline.net/test/Linnie%20Files/Users'%20Manual.TCN.doc> [retrieved Apr. 18,2006].

* cited by examiner

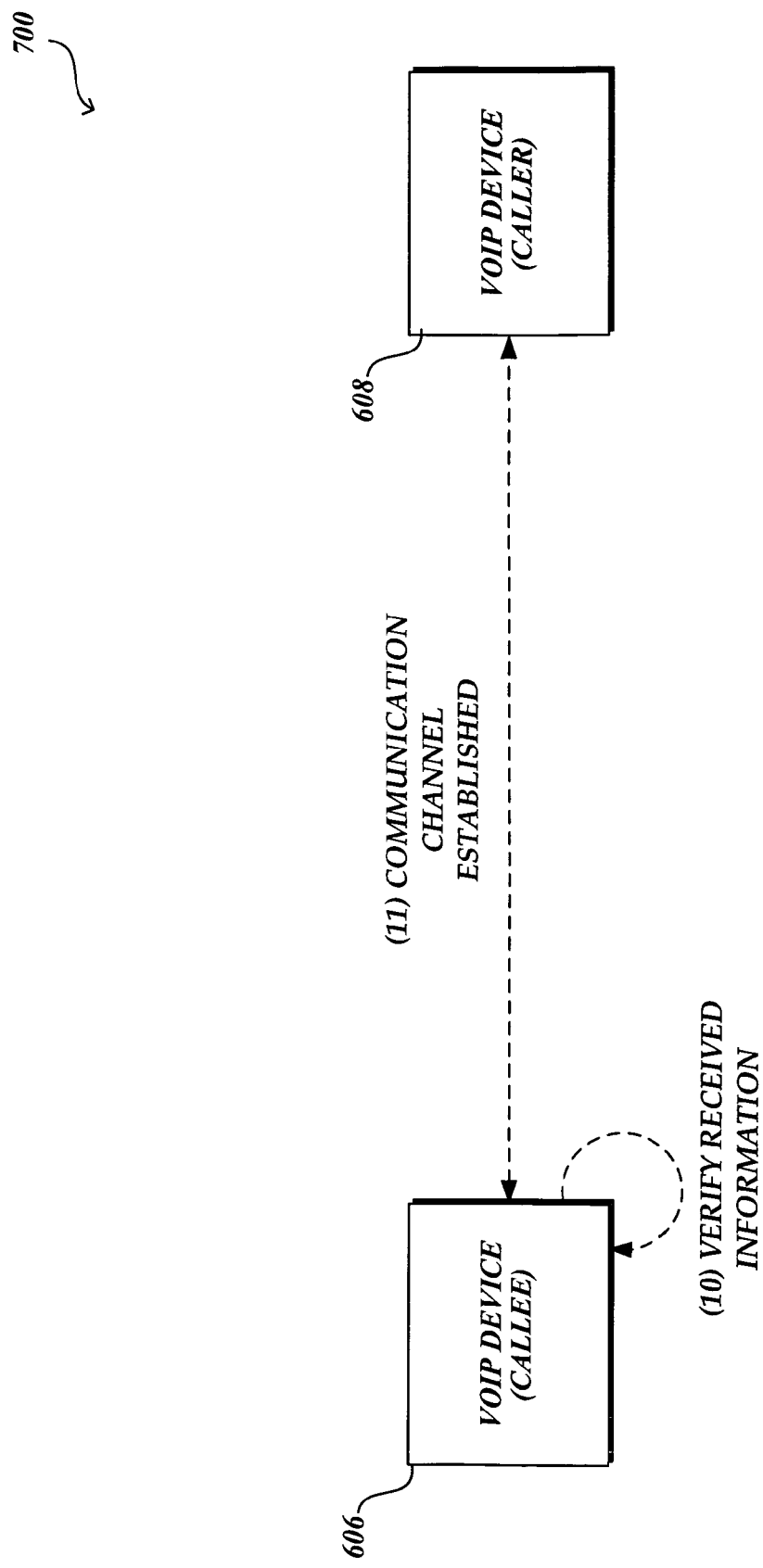

SECURED COMMUNICATION VIA LOCATION AWARENESS

BACKGROUND

Generally described, an Internet telephony system provides an opportunity for users to have a call connection with enhanced calling features compared to a conventional Public Switched Telephone Network (PSTN)-based telephony system. In a typical Internet telephony system, often referred to as Voice over Internet Protocol (VoIP), audio information is processed into a sequence of data blocks, called packets, for communications utilizing an Internet Protocol (IP) data network. During a VoIP call conversation, the digitized voice is converted into small frames of voice data and a voice data packet is assembled by adding an IP header to the frame of voice data that is transmitted and received.

VoIP technology has been favored because of its flexibility and portability of communications, ability to establish and control multimedia communication, and the like. VoIP technology will likely continue to gain favor because of its ability to provide enhanced calling features and advanced services which the traditional telephony technology has not been able to provide. One of the advanced services includes determining and announcing a physical location of a caller. While the location of a caller may be determined through traditional techniques such as directly examining the geographical or network location of the calling device, such techniques may be accidentally confounded or intentionally and maliciously defeated.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an aspect of the present invention, a method is provided for verifying a calling party based on location information. The method includes receiving location information provided from the calling party or the calling device and obtaining additional information necessary to verify the received location information during a connection set-up phase of a digital communication channel. The identity of the calling party is verified through evaluation of the received location information based on the obtained information. During evaluation, more information may be requested from the calling party and validated until the calling party is verified for a digital communication channel. In an aspect of the method, if the evaluation of the location information indicates a satisfactory degree of certainty about the identity of the calling party, a digital communication channel is established with the calling party.

In accordance with another aspect of the present invention, a computer-readable medium having computer-executable components including a communication interface component and an information confirming component is provided. The communication interface component is configured for receiving identity information from a caller as part of a digital voice conversation. In order to verify the identity information, the information confirming component requests additional information about the caller. After the communication interface component obtains the additional information about the caller from the digital voice conversation, the information confirming component determines whether the identity information is verified for the digital voice conversation by comparing the identity information and the additional information. For example, the information confirming component may utilize unique device identification information, geographic location information, network path information, or user profile information for verifying the identity information received from the caller.

In accordance with yet another aspect of the present invention, a method for collecting and verifying user information about several VoIP clients while the VoIP clients are engaged in a digital voice conversation is provided. User profile information relating to a location of each VoIP client is received and verified whether the user profile information is consistent with previously verified location information. An output representing the confirmed or unconfirmed user profile information is generated and presented.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 7A-7C are block diagrams illustrating interactions between two clients for collecting and exchanging location information in order to verify a caller in accordance with an embodiment of the present invention;

DETAILED DESCRIPTION

Generally described, embodiments of the present invention relate to a method and system for collecting and verifying the location information of a calling party and a device of the calling party. More specifically, embodiments of the present invention relate to a method and system for determining whether the identity of the calling party can be confirmed by evaluating "location information," within a certain degree of certainty for a secured digital communication. "Location information," as used herein, refers to any information which can be utilized to determine a physical or network location of the calling party or a device of the calling party. For example, the name and title of the calling party are location information if they can be used to determine the calling party's office location. Likewise, a unique device identification and IP address of a device are location information if they can be used to determine the network/geographical location of the device. The location information may be provided by the calling party or obtained from various sources over a digital conversation channel. The part of the provided location information which can be accidentally or intentionally altered is identified and evaluated to determine its accuracy.

A VoIP conversation is a data stream of information related to a conversation, such as contextual information and voice information, exchanged over a communication channel. For example, the location information of a caller is exchanged as part of contextual information represented in accordance with its corresponding "structured hierarchies." "Structured hierarchies," as used herein, are predefined organizational structures for arranging contextual information to be exchanged between two or more VoIP devices. For example, structured hierarchies may be eXtensible Markup Language (XML) namespaces. Although the present invention will be described with relation to illustrative structured hierarchies and an IP telephony environment with an emphasis on voice communication, one skilled in the relevant art will appreciate that the disclosed embodiments are illustrative in nature and should not be construed as limiting.

Figure 1:
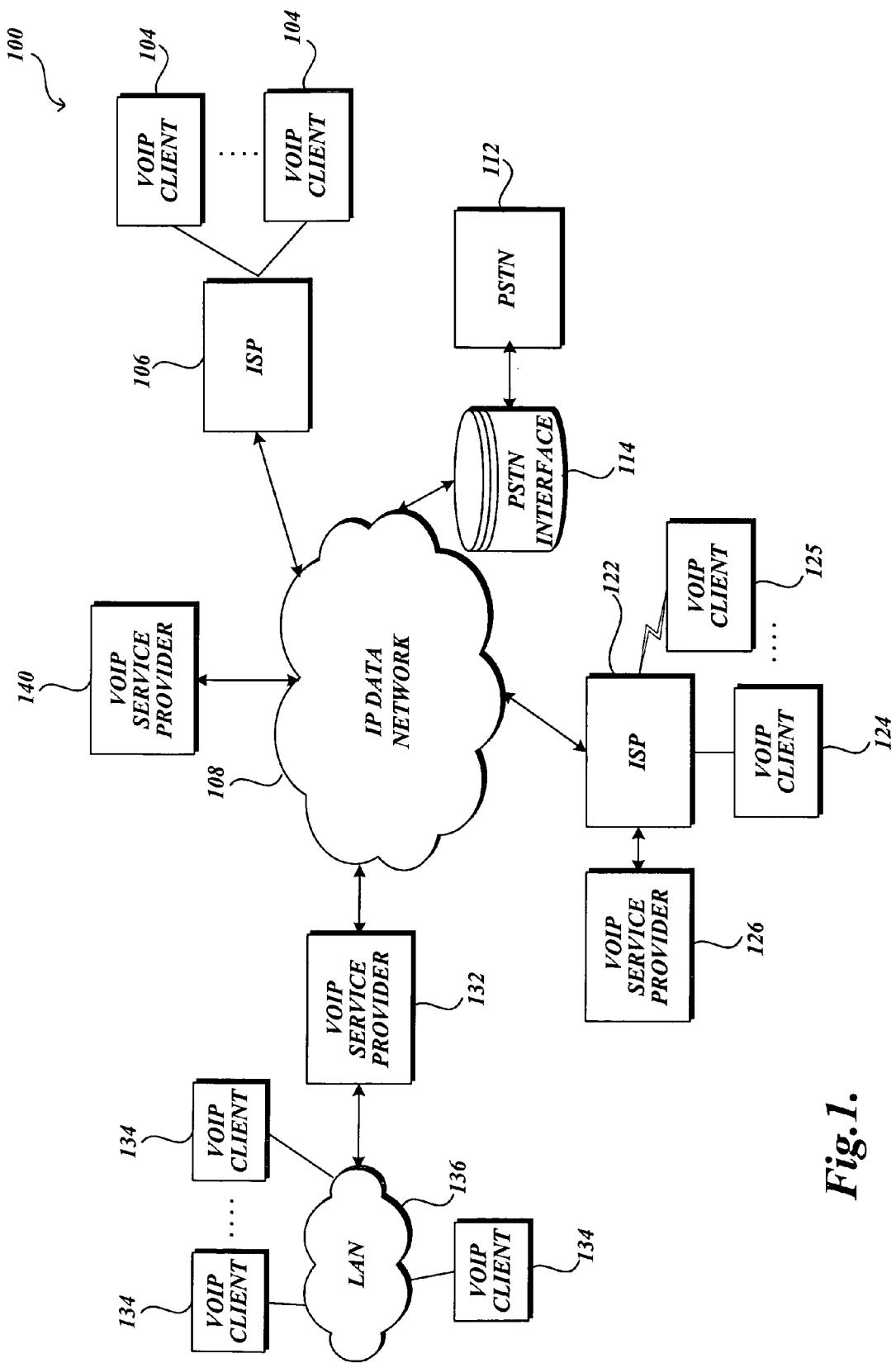
FIG. 1 is a block diagram illustrative of a VoIP environment for establishing a conversation channel between various clients in accordance with an aspect of the present invention.

With reference to FIG. 1, a block diagram of an IP telephony environment 100 for providing IP telephone services between various "VoIP clients" is shown. A "VoIP client," as used herein, refers to a particular contact point, such as an individual, an organization, a roBOT (BOT), a company, etc., one or more associated VoIP devices and a unique VoIP client identifier. For example, a single individual, five associated VoIP devices and a unique VoIP client identifier collectively make up a VoIP client. Similarly, a company including five hundred individuals and over one thousand associated VoIP devices may also be collectively referred to as a VoIP client and that VoIP client may be identified by a unique VoIP client identifier. Moreover, VoIP devices may be associated with multiple VoIP clients. For example, a computer (a VoIP device) located in a residence in which three different individuals live, each individual associated with separate VoIP clients, may be associated with each of the three VoIP clients. Regardless of the combination of devices, the unique VoIP client identifier may be used within a voice system to reach the contact point of the VoIP client.

Generally described, the IP telephony environment 100 may include an IP data network 108 such as the Internet, an intranet network, a wide area network (WAN), a local area network (LAN), and the like. The IP telephony environment 100 may further include VoIP service providers 126, 132 providing VoIP services to VoIP clients 124, 125, 134. A VoIP conversation may be exchanged as a stream of data packets corresponding to voice information, media information, and/or contextual information. As will be discussed in greater detail below, the contextual information includes metadata (information of information) relating to the VoIP conversation, the devices being used in the conversation, the contact point of the connected VoIP clients, and/or individuals that are identified by the contact point (e.g., employees of a company).

The IP telephony environment 100 may also include third party VoIP service providers 140. The VoIP service providers 126, 132, 140 may provide various calling features, such as incoming call-filtering, text data, voice and media data integration, and the integrated data transmission as part of a VoIP conversation. VoIP clients 104, 124, 125, 134 may create, maintain, and provide information relating to predetermined priorities for incoming calls.

VoIP service providers 132 may be coupled to a private network such as a company LAN 136, providing IP telephone services (e.g., internal calls within the private network, external calls outside of the private network, and the like) and multimedia data services to several VoIP clients 134 communicatively connected to the company LAN 136. Similarly, VoIP service providers, such as VoIP service provider 126, may be coupled to Internet Service Provider (ISP) 122, providing IP telephone services and VoIP services for clients of the ISP 122.

In one embodiment, one or more ISPs 106, 122 may be configured to provide Internet access to VoIP clients 104, 124, 125 so that the VoIP clients 104, 124, 125 can maintain conversation channels established over the Internet. The VoIP clients 104, 124, 125 connected to the ISP 106, 122 may use wired and/or wireless communication lines. Further, each VoIP client 104, 124, 125, 134 can communicate with the PSTN 112. A PSTN interface 114 such as a PSTN gateway may provide access between PSTN 112 and the IP data network 108. The PSTN interface 114 may translate VoIP data packets into circuit switched voice traffic for PSTN 112 and vice versa.

Conventional voice devices, may request a connection with the VoIP client based on the unique VoIP identifier of that client, and the appropriate VoIP device associated with the VoIP client will be used to establish a connection. In one example, an individual associated with the VoIP client may specify which devices are to be used in connecting a call based on a variety of conditions (e.g., connection based on the calling party, the time of day, etc.).

It is understood that the above-mentioned configuration in the environment 100 is merely exemplary. It will be appreciated by one of ordinary skill in the art that any suitable configurations with various VoIP entities can be part of the environment 100. For example, VoIP clients 134 coupled to LAN 136 may be able to communicate with other VoIP clients 104, 124, 125, 134 with or without VoIP service providers 132 or ISP 106, 122. Further, an ISP 106, 122 can also provide VoIP services to its client.

Figure 2:
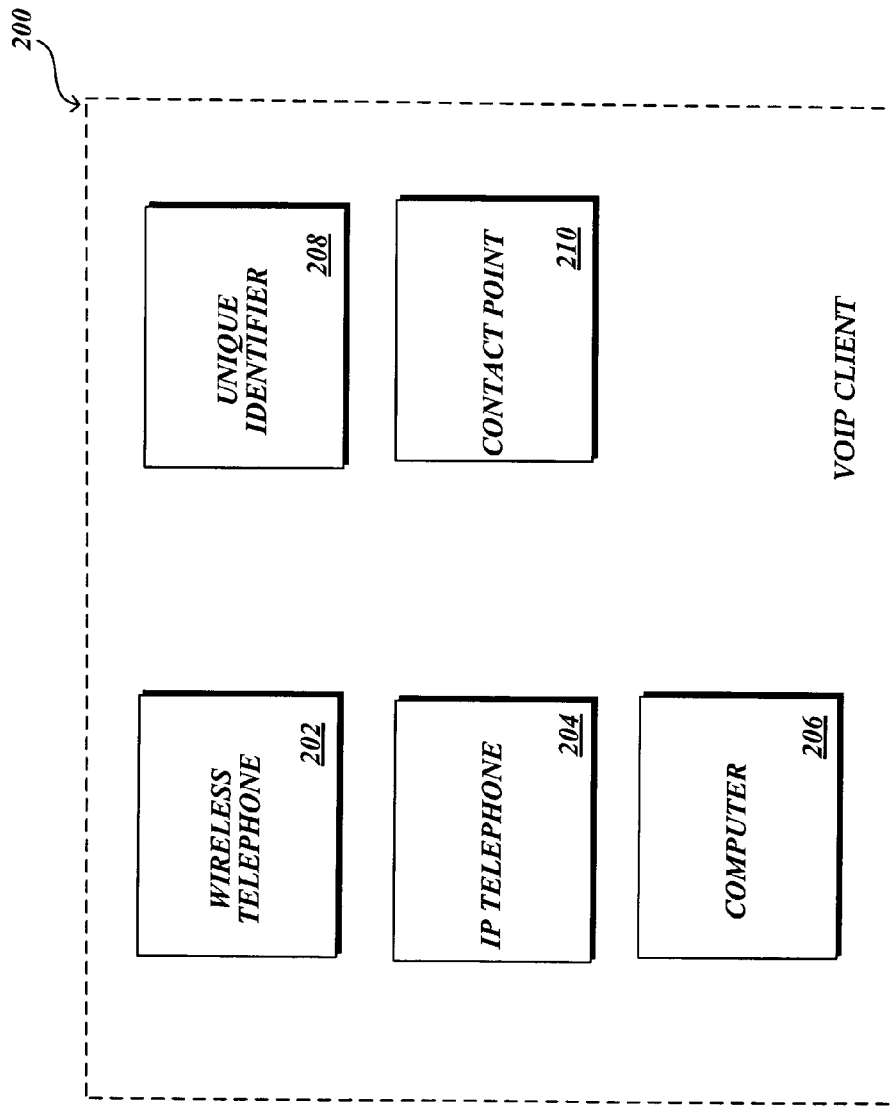
FIG. 2 is a block diagram illustrative of a VoIP client in accordance with an aspect of the present invention.

Referring now to FIG. 2, a block diagram illustrating an exemplary VoIP client 200 that includes several VoIP devices and a unique VoIP identifier, in accordance with an embodiment of the present invention, is shown. Each VoIP device 202, 204, 206 may include a storage that is used to maintain voice messages, address books, client specified rules, priority information related to incoming calls, etc. Alternatively, or in addition thereto, a separate storage, maintained for example by a service provider, may be associated with the VoIP client and accessible by each VoIP device that contains information relating to the VoIP client. In an embodiment, any suitable VoIP device such as a wireless phone 202, an IP phone 204, or a computer 206 with proper VoIP applications may be part of the VoIP client 200. The VoIP client 200 also maintains one or more unique VoIP identifiers 208. The unique VoIP identifier(s) 208 may be constant or change over time. The unique VoIP identifier is used to identify the client and to connect with the contact point 210 associated with the VoIP client. The unique VoIP identifier may be maintained on each VoIP device included in the VoIP client and/or maintained by a service provider that includes an association with each VoIP device included in the VoIP client. In the instance in which the unique VoIP identifier is maintained by a service provider, the service provider may include information about each associated VoIP device and knowledge as to which device(s) to connect for incoming communications. In an alternative embodiment, the VoIP client 200 may maintain multiple VoIP identifiers where a unique VoIP identifier may be temporarily assigned to the VoIP client 200 for each call session.

The unique VoIP identifier may be used similar to a telephone number in PSTN. However, instead of dialing a typical telephone number to ring a specific PSTN device, such as a home phone, the unique VoIP identifier is used to reach a contact point, such as an individual or company, which is associated with the VoIP client. Based on the arrangement of the client, the appropriate device(s) will be connected to reach the contact point. In one embodiment, each VoIP device included in the VoIP client may also have its own physical address in the network or a unique device number. For example, if an individual makes a phone call to a POTS client using a personal computer (VoIP device), the VoIP client identification number in conjunction with an IP address of the personal computer will eventually be converted into a telephone number recognizable in PSTN.

Figure 3:
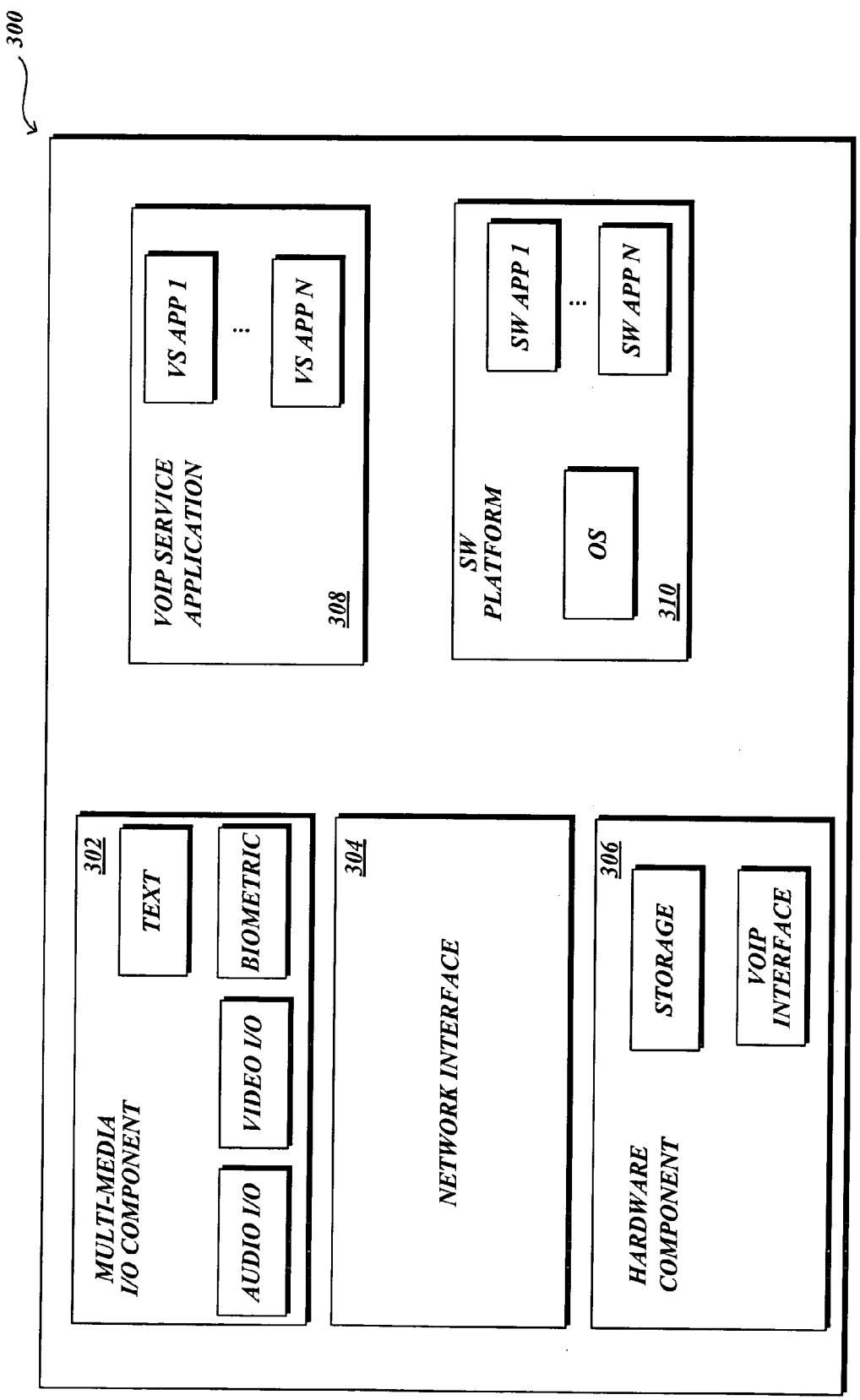
FIG. 3 is a block diagram illustrative of various components associated with a VoIP device in accordance with an aspect of the present invention.

FIG. 3 is a block diagram of a VoIP device 300 that may be associated with one or more VoIP clients and used with embodiments of the present invention. It is to be noted that the VoIP device 300 is described as an example. It will be appreciated that any suitable device with various other components can be used with embodiments of the present invention. For utilizing VoIP services, the VoIP device 300 may include components suitable for receiving, transmitting and processing various types of data packets. For example, the VoIP device 300 may include a multimedia input/output component 302 and a network interface component 304.

The multimedia input/output component 302 may be configured to input and/or output multimedia data (including audio, video, and the like), user biometrics, text, application file data, etc. The multimedia input/output component 302 may include any suitable user input/output components such as a microphone, a video camera, a display screen, a keyboard, user biometric recognition devices, and the like. The multimedia input/output component 302 may also receive and transmit multimedia data via the network interface component 304. The network interface component 304 may support interfaces such as Ethernet interfaces, frame relay interfaces, cable interfaces, DSL interfaces, token ring interfaces, radio frequency (air interfaces), and the like. The VoIP device 300 may comprise a hardware component 306 including permanent and/or removable storage such as read-only memory devices (ROM), random access memory (RAM), hard drives, optical drives, and the like. The storage may be configured to store program instructions for controlling the operation of an operating system and/or one or more applications and to store contextual information related to individuals (e.g., voice profiles, user biometrics information, etc.) associated with the VoIP client in which the device is included. In one embodiment, the hardware component 306 may include a VoIP interface card which allows a non-VoIP client device to transmit and receive a VoIP conversation.

The device 300 may further include a software platform component 310 for the operation of the device 300 and a VoIP service application component 308 for supporting various VoIP services. The VoIP service application component 308 may include applications such as data packet assembler/disassembler applications, a structured hierarchy parsing application, audio Coder/Decoder (CODEC), video CODEC and other suitable applications for providing VoIP services. The CODEC may use voice profiles to filter and improve incoming audio.

Figure 4:
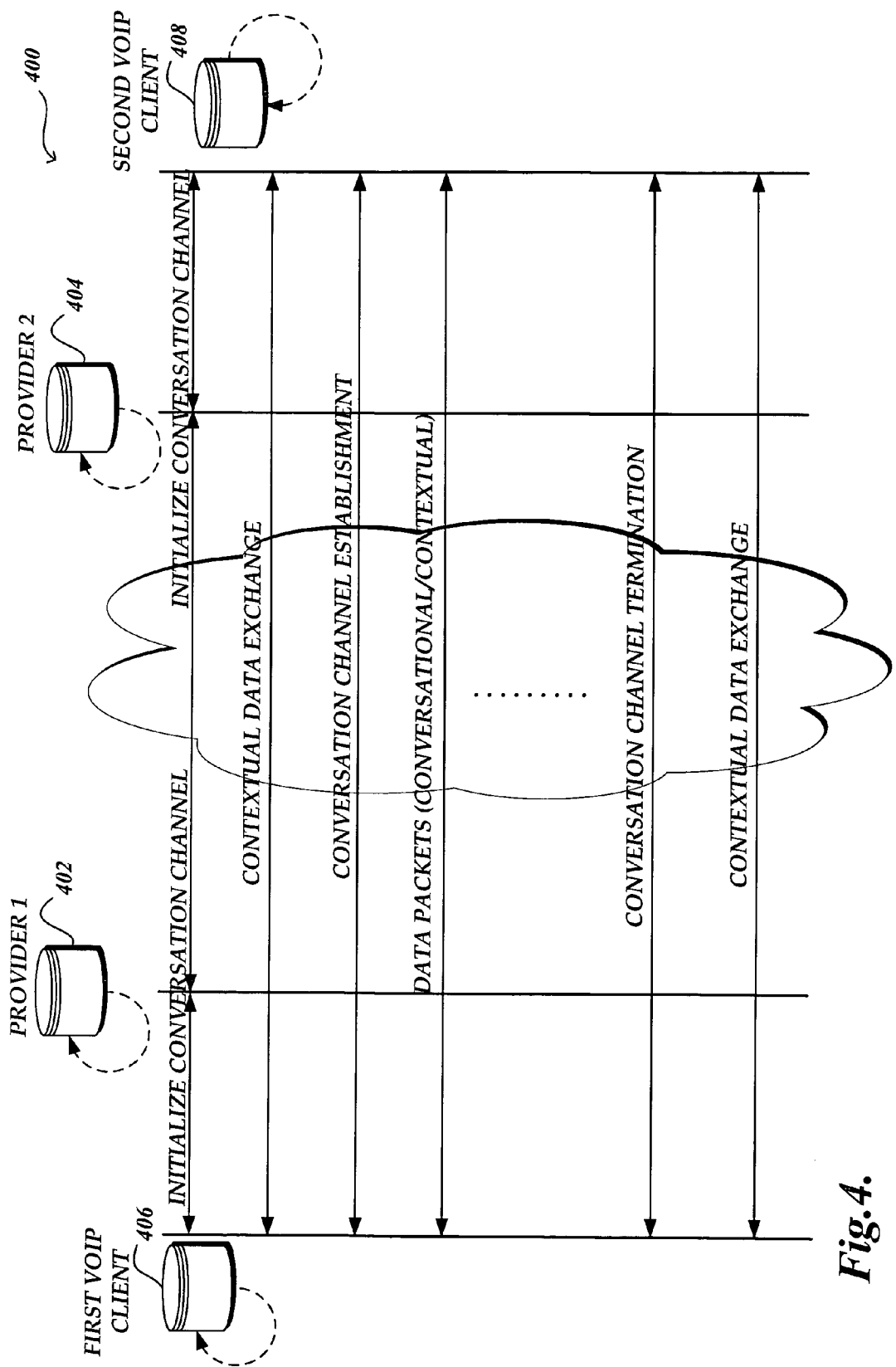
FIG. 4 is a block diagram illustrative of the exchange of data between two VoIP clients over a conversation channel in accordance with an aspect of the present invention.
Figure 5:
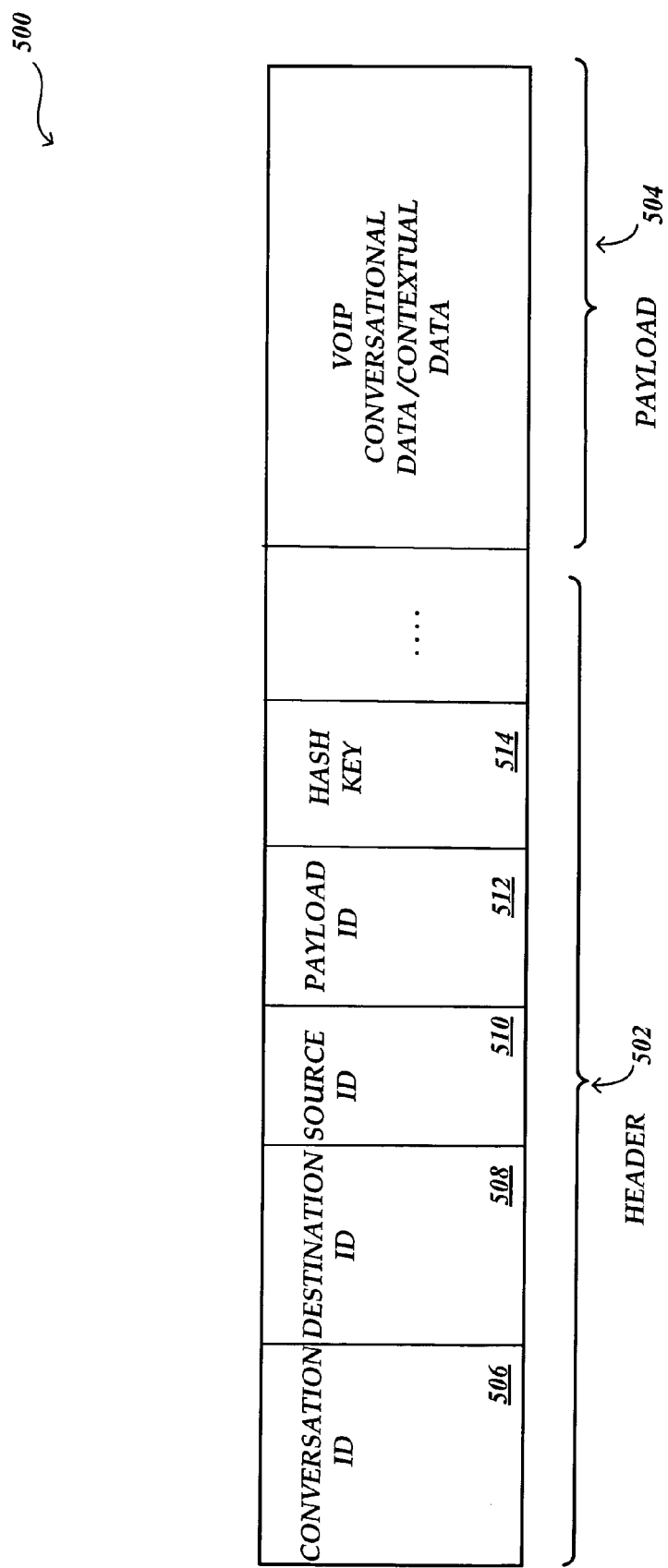
FIG. 5 is a block diagram of a data packet used over a communication channel established in the VoIP environment of FIG. 1.
Figure 6:
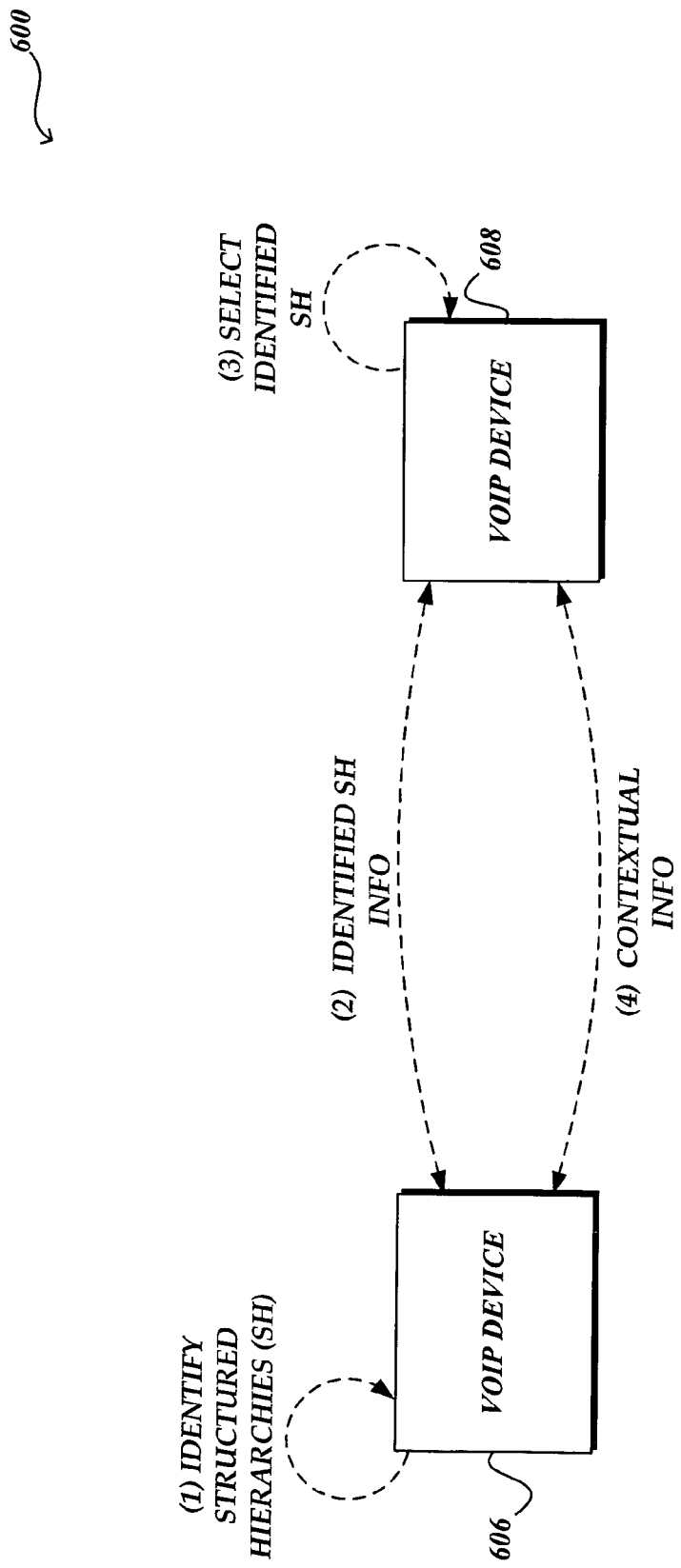
FIG. 6 is a block diagram illustrating interactions between two VoIP clients for transferring contextual information defined by identified structured hierarchies in accordance with an aspect of the present invention.

It is to be noted that FIGS. 4, 5, and 6 are depicted herein to discuss general VoIP conversation channel implementations which are utilized when location information is collected and transmitted as part of a VoIP conversation, or when a VoIP communication is established after an identity of a calling party is verified via evaluating the location information.

With reference to FIG. 4, a block diagram illustrative of a conversation flow 400 between VoIP devices of two different VoIP clients over a conversation channel in accordance with an embodiment of the present invention is shown. During a connection set-up phase, a VoIP device of a first VoIP client 406 requests to initiate a conversation channel with a second VoIP client 408. In an illustrative embodiment, a VoIP service provider 402 (Provider 1) for the first VoIP client 406 receives the request to initiate a conversation channel and forwards the request to a VoIP service provider 404 (Provider 2) for the second VoIP client 406. While this example utilizes two VoIP service providers and two VoIP clients, any number and combination of VoIP clients and/or service providers may be used with embodiments of the present invention. For example, only one service provider may be utilized in establishing the connection. In yet another example, communication between VoIP devices may be direct, utilizing public and private lines, thereby eliminating the need for a VoIP service provider. In a peer-to-peer context, communication between VoIP devices may also be direct without having any service providers involved.

There is a variety of protocols that may be selected for use in exchanging information between VoIP clients, VoIP devices, and/or VoIP service providers. For example, when Session Initiation Protocol (SIP) is selected for a signaling protocol, session control information and messages will be exchanged over a SIP signaling path/channel and media streams will be exchanged over a Real-Time Transport Protocol (RTP) path/channel. For the purpose of discussion, a communication channel, as used herein, generally refers to any type of data or signal exchange path/channel. Thus, it will be appreciated that, depending on the protocol, a connection set-up phase and a connection termination phase may require additional steps in the conversation flow 400.

For ease of explanation, we will utilize the example in which the first VoIP client 406 and the second VoIP client 408 each include only one VoIP device. Accordingly, the discussion provided herein will refer to connection of the two VoIP devices. The individual using the device of the first VoIP client 406 may select or enter the unique identifier of the client that is to be called. Provider 1 402 receives the request from the device of the first VoIP client 408 and determines a terminating service provider (e.g., Provider 2 404 of the second VoIP client 408) based on the unique client identifier included in the request. The request is then forwarded to Provider 2 404. This call initiation will be forwarded to the device of the second VoIP client. A conversation channel between the device of the first VoIP client 406 and a device of the second VoIP client 408 can then be established.

In an illustrative embodiment, before the devices of the first VoIP client 406 and the second VoIP client 408 begin to exchange data packets, contextual information may be exchanged. As will be discussed in greater detail below, the contextual information may be packetized in accordance with a predefined structure that is associated with the conversation.

Any device associated with the first VoIP client 406, the service provider of the first VoIP client 406, or a different device/service provider may determine the structure based on the content of the contextual information. In one embodiment, the exchanged contextual information may include information relating to the calling VoIP client (e.g., the first VoIP client 406), the device, and the VoIP client (e.g., the second VoIP client 408) being called. For example, the contextual information sent from the calling VoIP client may include location information about the calling VoIP client. In this way, the called VoIP client can easily verify, via the location information, the identity of the called VoIP client.

Available media types, rules of the calling client, the client being called, and the like may also be part of the contextual information that is exchanged during the connection set-up phase. For example, a set of rules may indicate that some portion of location information in conversation data should not be provided to the called client unless authorized by the calling client. The contextual information may be processed and collected by one of the devices of the first VoIP client 406, one of the devices of the second VoIP client 408, and/or by the VoIP service providers (e.g., Provider 1 402 and Provider 2 404), depending on the nature of the contextual information. In one embodiment, the VoIP service providers 402, 404 may add/delete some information to/from the client's contextual information before forwarding the contextual information.

In response to a request to initiate a conversation channel, the second VoIP client 408 may accept the request for establishing a conversation channel or execute other appropriate actions such as rejecting the request via Provider 2 404. The appropriate actions may be determined based on the obtained contextual information. When a conversation channel is established, a device of the first VoIP client 406 and a device of the second VoIP client 408 start communicating with each other by exchanging data packets. As will be described in greater detail below, the data packets, including conversation data packets and contextual data packets, are communicated over the established conversation channel between the connected devices.

Conversation data packets carry data related to a conversation, for example, a voice data packet or multimedia data packet. Contextual data packets carry information relating to data other than the conversation data. Once the conversation channel is established, either the first VoIP client 406 or the second VoIP client 408 can request to terminate the conversation channel. Some contextual information may be exchanged between the first VoIP client 406 and the second VoIP client 408 after the termination.

FIG. 5 is a block diagram of a data packet structure 500 used over a communication (conversation) channel in accordance with an embodiment of the present invention. The data packet structure 500 may be a data packet structure for an IP data packet suitable for being utilized to carry conversation data (e.g., voice, multimedia data, and the like) or contextual data (e.g., information relating to the VoIP services, and the like). However, any other suitable data structure can be utilized to carry conversation data or contextual data. The data packet structure 500 includes a header 502 and a payload 504. The header 502 may contain information necessary to deliver the corresponding data packet to a destination. Additionally, the header 502 may include information utilized in the process of a conversation. Such information may include conversation ID 506 for identifying a conversation (e.g., call), a Destination ID 508, such as a unique VoIP identifier of the client being called, a Source ID 510 (unique VoIP identifier of the calling client or device identifier), Payload ID 512 for identifying the type of payload (e.g., conversation or contextual), individual ID (not shown) for identifying the individual to which the conversation data is related, and the like. Further, the header 502 may include a hash key 514 for a secured transmission of location information about a calling device as part of contextual data of the payload 504. In one embodiment, a hash key 514 may be used in conjunction with a private authentication key to access location information of the calling device and/or an individual user of the calling device. In an alternative embodiment, the hash key 514 may be utilized to determine IP trace-back information which is to be compared with IP path information in the payload 504.

In an illustrative embodiment, the header 502 may also contain information regarding Internet Protocol versions, and payload length, among others. The payload 504 may include conversational or contextual data relating to an identified conversation. More specifically, location information may be included as part of contextual information and identified by a recipient device of such contextual information. For example, some location information, such as physical location of the sending device, may be used to confirm the identity of the sending party. Additionally, more than one type of location information (e.g., unique device identification, Internet Protocol address, Global Positioning System (GPS) location information, user profile information, Internet Protocol path information, gateway information, access point information, etc.) may be used to confirm the identity of the sending party. As will be appreciated by one of ordinary skill in the art, additional headers may be used for upper layer headers such as a TCP header, a UDP header, and the like.

As will be discussed in greater detail in FIGS. 11A-11E, in one embodiment of the present invention, a structured hierarchy may be predefined for communicating contextual information over a VoIP conversation channel. The contextual information may include any information relating to VoIP clients, VoIP devices, conversation channel connections (e.g., call basics), conversation context (e.g., call context), a set of rules specifying about a visual confirmation and corresponding response, a scope of content in a visual confirmation, etc. More specifically, the contextual information may include client preference, client rules, client's location (e.g., user location, device location, etc.), biometrics information, the client's confidential information, VoIP device's functionality, VoIP service provider's information, media type, media parameters, calling number priority, keywords, information relating to application files, and the like. The contextual information may be processed and collected at each VoIP client and/or the VoIP service providers depending on the nature of the contextual data. In one aspect, the VoIP service providers may add, modify and/or delete the VoIP client's contextual data before forwarding the contextual information. For example, the client's confidential information will be deleted by the VoIP service provider associated with that client unless the client authorizes such information to be transmitted. In some cases, a minimal amount of contextual information is transmitted outside of an intranet network.

With reference to FIG. 6, a block diagram 600 illustrating interactions between two VoIP clients for transferring contextual information (e.g. location information), in accordance with an embodiment of the present invention, is shown. As with FIG. 4, the example described herein will utilize the scenario in which each client only has one device associated therewith and the connection occurs between those two devices. In one embodiment, devices of VoIP device 606 and VoIP device 608 have established a VoIP conversation channel. It may be identified which structured hierarchies will be used to carry certain contextual information by VoIP device 606. The information regarding the identified structured hierarchies may include information about which structured hierarchies are used to carry the contextual information, how to identify the structured hierarchy, and the like. Such information will be exchanged between VoIP device 606 and VoIP device 608 before the corresponding contextual information is exchanged. Upon receipt of the information identifying which structured hierarchy will be used to carry the contextual information, VoIP device 606, 608 looks up predefined structured hierarchies (e.g., XML namespace and the like) to select the identified structured hierarchies. In one embodiment, the predefined structured hierarchies can be globally stored and managed in a centralized location accessible from a group of VoIP clients. In this embodiment, a Uniform Resource Identifier (URI) address of the centralized location may be exchanged between VoIP device 606 and VoIP device 608.

In another embodiment, each VoIP client may have a set of predefined structured hierarchies stored in a local storage of any devices or a dedicated local storage which all devices can share. The predefined structured hierarchies may be declared and agreed upon between VoIP clients before contextual information is exchanged. In this manner, the need to provide the structure of the contextual data packets may be eliminated and thus the amount of transmitted data packets corresponding to the contextual data is reduced. Further, by employing the predefined structured hierarchies, data packets can be transmitted in a manner which is independent of hardware and/or software.

Upon retrieving the identified structured hierarchies, VoIP device 606, 608 is expecting to receive a data stream such that data packets corresponding to the data stream are defined according to the identified structured hierarchies. VoIP device 606, 608 can begin sending contextual information represented in accordance with the identified structured hierarchies. In one embodiment, upon receipt of the contextual information, VoIP device 606, 608 starts a data binding process with respect to the contextual information. For example, instances of the identified structured hierarchies may be constructed with the received contextual information.

Figure 7A:
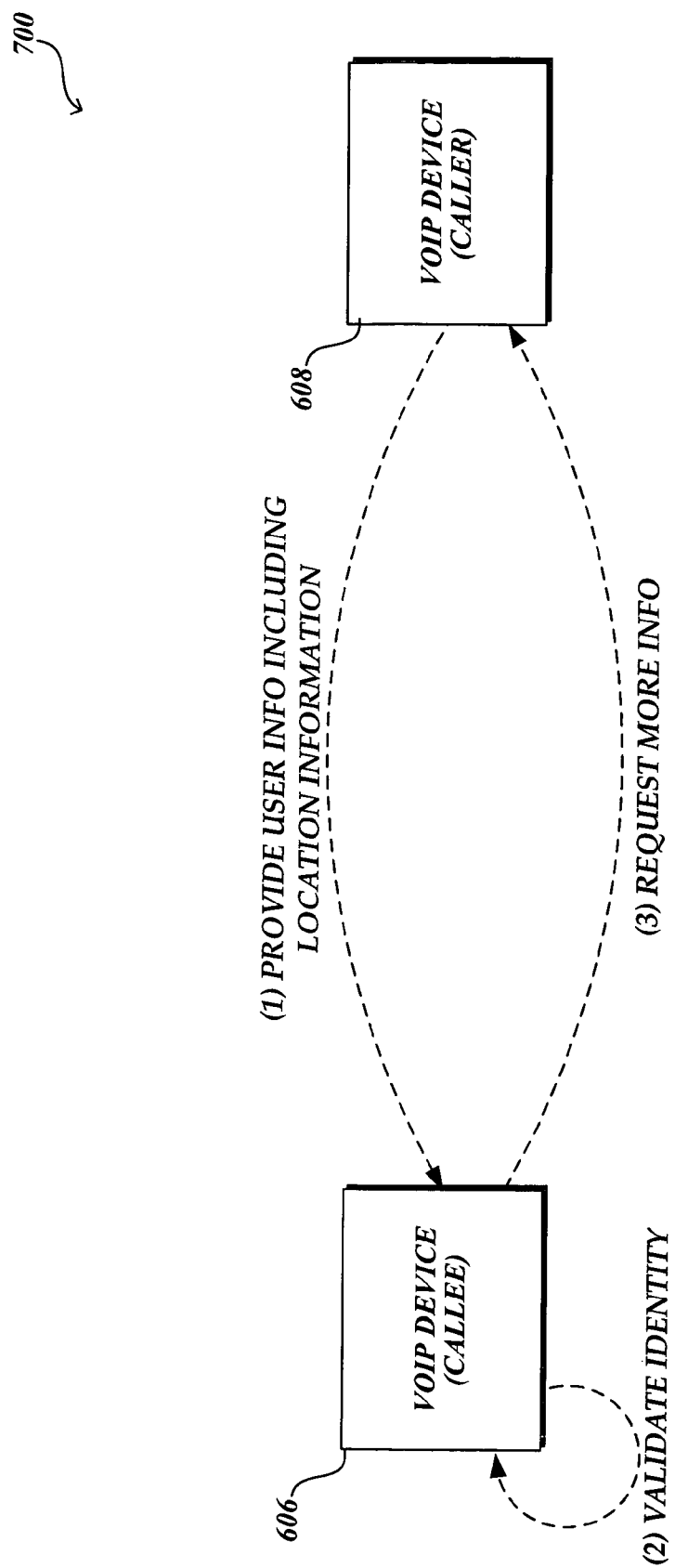
Figure 7B:
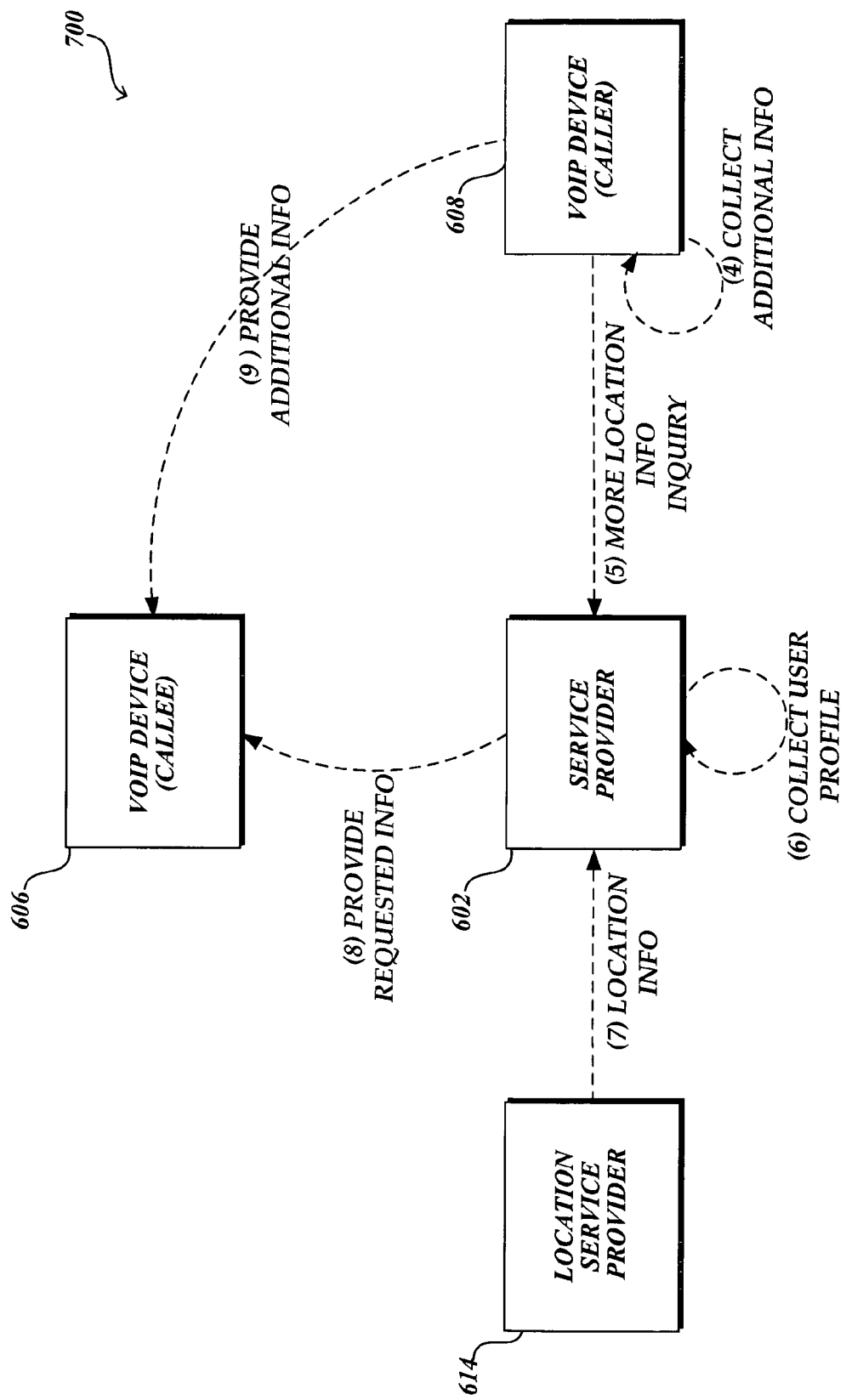

FIGS. 7A-7C are block diagrams 700 illustrating interactions among VoIP entities for collecting and exchanging location information in order to authenticate a caller in accordance with embodiments of the present invention. The VoIP entities may include VoIP clients, a VoIP service provider, and the like. While this example utilizes one VoIP service provider and two VoIP clients, any number and combination of VoIP clients and/or service providers may be used with embodiments of the present invention. It is also contemplated that collecting and transferring location information associated with a VoIP entity can be done numerous times before, during, and/or at the end of the conversation. As with FIG. 4, the example described herein will utilize the scenario in which each client only has one device associated therewith and the connection occurs between those two devices. For purposes of this example, the process will be described in which an individual (referred to as the caller) is using VoIP device 606 to establish a connection with a second individual (referred to as the callee) that uses VoIP device 608. At an initial point, the caller's VoIP device 608 generates a call request which is transmitted to the callee's VoIP device 606.

Referring to FIG. 7A, during a connection set-up phase, the caller's VoIP device 608 may transmit basic user information including location information of the device and the caller as part of contextual information to the callee's VoIP device 606. Upon receipt of the call request and the contextual information, the callee's VoIP device 606 may process the contextual information to extract location information and start evaluating the provided location information. In an illustrative embodiment, a caller may voluntarily provide location information which can be used to verify the caller's identity. For example, the caller may provide the caller's name, position, and current location at the same time when the call request is transmitted to the callee's VoIP device 606. The caller's identity can be verified by evaluating the provided information. In one embodiment, the caller can specify the caller rules indicating that a set of contextual information (e.g., basic location information, VoIP client identification number, device information, etc.) is automatically provided to the callee at the time of a call request. As mentioned above, the provided location information can be used to verify the caller's identity, however, not all of the provided location information can be trusted because of the possibility of accidentally confounded or intentionally altered location information.

Upon receipt of the location information, the callee may determine whether the caller's identity can be verified based on the provided location information before the callee decides to accept or reject the call request from the caller. If the provided information is not sufficient to verify the caller's identity, the callee may request additional information related to the location from the caller or other sources. For example, if the caller indicates that the caller is calling from Seattle, Wash., the callee may want geographical location information of the caller's VoIP device 608 in order to validate whether the caller is in fact calling from Seattle, Wash. In this case, the callee does not need to know the street address of the caller's location. The callee may request geographical location information which can be used to verify state and city information of the caller. If the geographical location information of the caller's device is accurately provided, the callee may confirm the caller's identity. In some instances, the callee may request other information to evaluate the provided location information to verify its accuracy. For example, call connection routing information (such as router IP address, location, and other junctions/connection points along the way between the caller and the service provider), device information (device unique identifier, IP address, etc.), network location information (IP trace-back information, gateway, access point, etc.) or the like may be requested and compared with the provided location information as part of the evaluation process of the provided location information.

In response to the request, the caller's VoIP device 608 may collect the additional information according to the request and transmit the additional information to the callee's VoIP device 606. Of course, the caller has a choice to ignore or reject the callee's request because the caller does not want to release the requested information to the callee. Moreover, if the requested location information is not available within the caller's VoIP device 608, the caller's VoIP device 608 may contact a proper source to obtain such information. Alternatively, the caller's VoIP device 608 provides the information about the proper source so that the callee can directly obtain the information.

In one embodiment, a VoIP client registers user profile information with an authorized third party (e.g., SP 602) where the registered user profile information can be shared among several VoIP clients. A VoIP client can request to release a portion of the user profile to a designated VoIP client or to block a portion of a user profile from the designated VoIP client. In this embodiment, the caller's VoIP device 608 may collect part of additional information and/or the caller may request SP 602 to provide part or all of user profile information to the callee. Alternatively, the callee may specifically request the caller to provide additional information via SP 602. As will be appreciated by one of ordinary skill in the art, SP 602 may be coupled to a third-party location service provider 614. The location service provider 614 may be available for providing particular types of location information to SP 602. As will be discussed in greater detail below, location information may include various types of information relating to client defined location, device defined location, geographic location, virtual/logical location and the like. An example of the location service provider 614 may be a Global Positioning System (GPS) service server, a User location service server (e.g., Internet locator server, a conferencing directory server on a network, etc.), and the like. The Internet location server may be used to identify individual users via current IP address. It is to be understood that the callee can obtain location information about the caller from various sources, directly from the location service provider 614, SP 602, the caller or the calling device.

Referring to FIG. 7C, the callee authenticates the identity of the caller based on the location information (e.g., the provided location information and additional location information). In one embodiment, the callee's VoIP device 606 may evaluate the provided information and additional information and generate an output including a portion of location information which is validated and another portion of location information which fails to be validated. The generated output may be presented to the callee. In this manner, the callee can make a decision whether to accept or reject the call request. As will be discussed in greater detail below, in an alternative embodiment, the identity of the caller may be determined in a scale of certainty based on the evaluation of the location information. For example, the caller's identity can be verified with 80% of certainty if most of the provided location information is evaluated as accurate. In one embodiment, if the provided location information is verified with a satisfactory degree of certainty, the caller's identity is assumed to be verified. After the caller's identity is verified, the call request from the caller may be accepted and a communication channel is established between the callee's VoIP device 606 and the caller's VoIP device 608.

Assume a scenario where a parent receives a call request for a conference call from a principal of a child's school along with identity information such as name, title, and phone number, and the parent has not previously spoken with the principal. The parent verifies that the name, title, and phone number are valid (alternatively, a device of the parent can validate the name, title, and school address and provide the result to the parent). However, the parent is not sure that the caller is the principal since the name, title, and phone number information can easily be found from the school's Web page. The parent needs extra information, such as current location (GPS or triangulation location) of the caller, to be certain of him/her. If the caller can provide the current location information which is consistent with the school location, the parent can confirm within an acceptable degree of certainty that the caller is the principal. However, if the caller cannot provide the current location information due to lack of functionality in the device, other location information can be used to authenticate the identity of the caller. The parent may think that if the caller can provide the zip code of the principal's home address, he or she can be 80% sure that the caller is the principal. The parent may request the zip code information to verify the caller. Upon receipt of the zip code information, the parent may assume that the identity of the caller is verified and accept the call request to establish a communication channel. During the conversation, the parent may request more location information in order to periodically authenticate the caller. Likewise, based on the content of the conversation (e.g., private information, medical history, Social Security Number, etc.), the parent may request additional information to authenticate the caller with a higher degree of certainty.

It is to be understood that the satisfactory degree of certainty and type of location information necessary to authenticate the caller can be different from one caller to the next. For example, assume that, this time, a parent receives a call request from a local librarian along with location information such as the library name, address, and phone number. The location information may be voluntarily provided from the caller or the calling device. The parent verifies that only the library name and phone number are accurate but not the address. However, the parent determines that a lower degree of certainty is required since the parent knows the librarian and the provided address is very close to the address of the library. In this case, the parent may not need extra information to be certain of the caller's identity before accepting the call connection.

It is to be understood that, although the examples discussed in FIGS. 7A-7C are generally focused on evaluating location information for authenticating the caller's identity, the examples are described for illustrative purposes and thus should not be construed as limiting.

Figure 8:
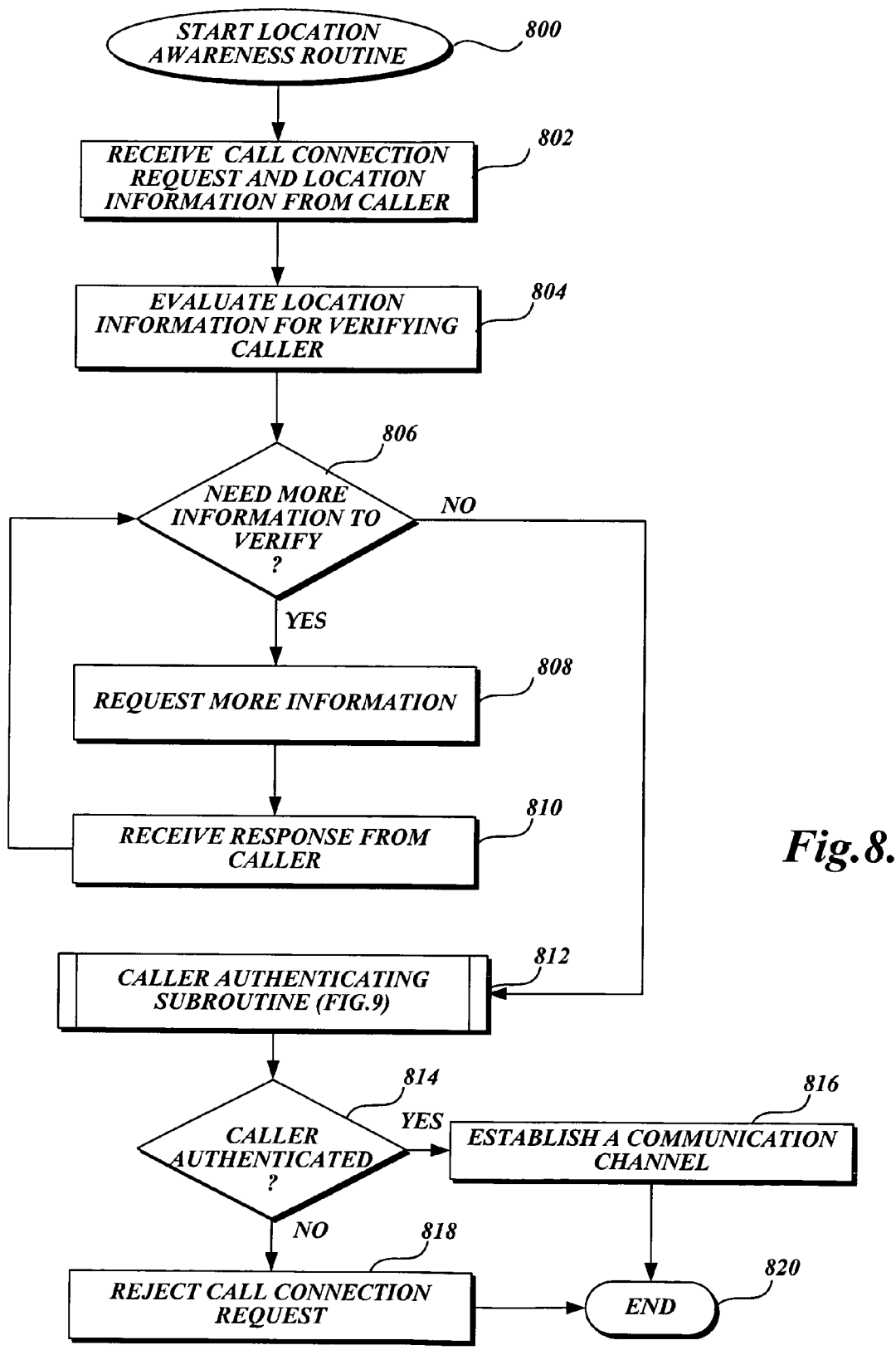
FIG. 8 is a flow diagram illustrating a location awareness routine for verifying a caller's identity via the caller's location information in accordance with embodiments of the present invention.

Referring to FIG. 8, a flow diagram is provided to depict a location awareness routine 800 for verifying a caller's identity via evaluating the caller's location information in accordance with embodiments of the present invention. Beginning with block 802, a call connection request is received from a caller. A set of contextual information including the caller's self-reported location information and basic location information may be provided. As mentioned above, a calling device of the caller may transmit basic location information which can be used by a callee to verify the caller's identity. The simple example can be a caller ID. Further, the caller can voluntarily provide location information indicating the whereabouts of the caller.

In one embodiment, the location information at a particular granularity level is provided to the callee, such as at address level, street level, town level, city level, state level, etc. In another embodiment, the location information in a particular context which the callee and the caller can understand is provided, for example, my family doctor's office, or a company's Redmond campus, a company's main building in CA, etc. In addition, the caller can voluntarily provide precise location information such as "at the main lobby of a main building in Seattle, Wash."

At block 804, the provided location information may be evaluated as part of the verification process of the caller's identity. At decision block 806, a determination is made as to whether additional information from the caller is needed to evaluate the provided location information. For example, if the provided location information is "calling from a company's main building," the address of the company's main building can be used to confirm whether the call request is made from the company's main building. If it is determined at decision block 806 that additional information is needed, at block 808 the callee may request the additional information from the caller. At block 810, a response to the request may be received from the caller. If the response is not received within a predetermined time, the call connection request may be rejected, or the request for additional information may be transmitted again. The routine 800 returns to block 806 and repeats the above mentioned steps until no more information from the caller is needed. If it is determined at decision block 806 that no more information from the caller is needed, at block 812 the caller's identity may be authenticated for the call via a caller authenticating subroutine 900 (FIG. 9) which returns a result indicating whether the caller's identity is verified within a satisfactory degree of certainty based on further evaluation of the provided location information. At decision block 814, a determination is made as to whether the result from the caller authenticating subroutine 900 indicates that caller's identity is verified with a satisfactory degree of certainty. If it is determined at decision block 814 that the caller's identity is verified with a satisfactory degree of certainty, at block 816, a communication channel may be established. If it is determined at decision block 814 that the caller's identity is not verified with a satisfactory degree of certainty, at block 818 the call connection request may be rejected.

Figure 9:
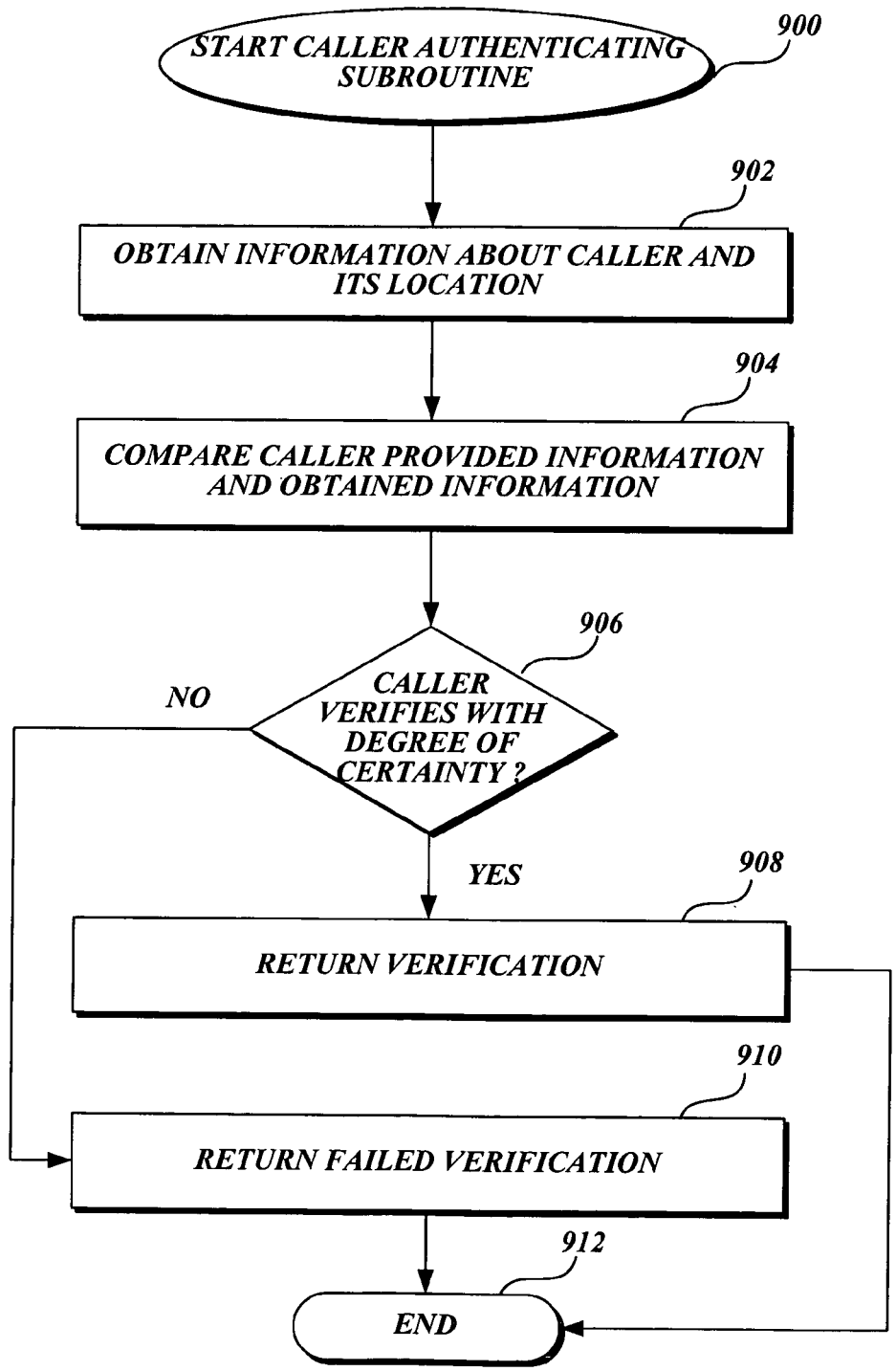
FIG. 9 is a flow diagram illustrating a caller verifying subroutine utilized by the location awareness routine in FIG. 8.

Referring to FIG. 9, a flow diagram for a caller authenticating subroutine 900 is depicted in accordance with embodiments of the present invention. As with FIG. 8, the provided location information from the caller may be evaluated by comparing the provided location information with the location information obtained from various sources. In one embodiment, after the location information is obtained, a determination may be made as to which location information is most appropriate to be used for evaluation since the obtained location information can be accurate to varying degrees.

For the purpose of discussion, assume that the obtained location information is trusted, accurate information which is free from intentional or accidental alteration. Further assume that if there is any conflict among the obtained location information, some logic is available to resolve the conflict before the evaluation process.

After the caller voluntarily provides the location information, at block 902, information about the caller's location and identity may be obtained from various sources. As mentioned above, the information about the caller's location and identity may be obtained from the calling device, and/or an authenticated third party which provides secured user profile information, a geographical location of the calling device, and a network location of the calling device, to a designated client.

As discussed in FIG. 5, a hash key in a data packet header may be utilized to obtain location information. The hash key may be used in conjunction with a private authentication key to securely access the location information of the client. Alternatively, the hash key may be utilized to determine IP trace-back information which is to be compared with IP path information provided by the caller.

For example, each gateway that supports VoIP communications may have a unique hash key associated with it and a centralized database maintains gateway information based on the hash key. When a data packet including IP address is transmitted via a gateway, the hash key associated with the gateway may be included in the header of the data packet. In this manner, location information (e.g., gateway information) can be securely injected into data packet streams. When the callee's device receives such a data packet, the provided IP address may be compared with the gateway information which can be traced by the header information. In order to prevent spoofing, each gateway may periodically change its hash key and update the centralized database. Likewise, an access point may have a unique hash key associated with it and a centralized database maintains location information of an access point based on the associated hash key such that with the hash key, the location of the access point can be securely obtained. For example, assume that a first access point covers the first floor and the second floor of the main building of company X while a second access point covers the third floor of the main building of company X. If a caller indicates that the caller is at the first floor of company X, the header information may be utilized to verify whether the access point the caller's wireless device is connected to is the first access point. As such, the access point which the calling device used to transmit data packets can be utilized to identify location information about the caller. As with the gateway information, each access point periodically updates the associated hash key.

At block 904, the location information provided by the caller and the obtained information may be compared to evaluate the validity of the location information provided by the caller. If the location information provided by the caller is considered to be accurate, the identity of the caller is also verified. The identity of the caller may be determined in a scale of certainty based on the evaluation of the location information provided by the caller. For example, the caller's identity can be verified with a degree of certainty based on the level of accuracy in the provided location information. In one embodiment, if the provided location information is verified with a satisfactory degree of certainty, the caller's identity is assumed to be verified.

At decision block 906, a determination is made as to whether the identity of the caller is verified within a satisfactory degree of certainty. The satisfactory degree of certainty may be previously defined by the callee. Alternatively, the callee may decide whether the caller's identity is verified within a degree of certainty on the fly. Of course, the callee can reject the call request even if the identity of the caller is verified. If it is determined at decision block 906 that the identity of the caller is verified with a satisfactory degree of certainty, at block 908 a result indicating that the caller's identity is verified is returned. If it is determined at decision block 906 that the caller's identity is not verified, at block 910 a result indicating that the caller is not verified is returned. In one embodiment, more information from the caller can be further collected and subsequently more information to verify the collected information may be obtained from various sources until the identity of the caller is verified within a satisfactory degree of certainty. After the result is returned (block 908 or block 910), the routine 900 completes at block 912.

Although the aforementioned examples are discussed based on a scenario where two VoIP clients exchange information during a connection set-up phase, it is to be understood that the examples are discussed for illustrative purposes and thus should not be construed as limiting. It is contemplated that location information of a caller may be collected and evaluated anytime during a conversation. For example, the location information of the calling party may be evaluated several times during a conversation and the evaluated location information may be presented to the caller. Further, the location information of the caller may be utilized for determining language preference, time zone, sensitive subject to avoid, etc. In one embodiment, in response to the provided location information, the callee may send a confirmation message if the provided location information is verified as accurate or send a warning message otherwise. Subsequently, the caller may respond to the warning message by providing additional information.

It is further contemplated that routines 800 and 900 can be implemented when a group of people are participating in a multiparty conversation. The location information of a group of people is obtained and evaluated before, during, and/or at the end of the multiparty conversation. For example, assume that a group of people from different companies have a teleconference call. A host of the teleconference call may want to have a list of participants' names and corresponding location information for verification purposes. After a participant establishes a connection after the proper verification process, the participant may be requested to provide additional location information, such as current location, affiliated company name, title, name, etc. Each participant can be verified again based on the provided location information. For example, a participant indicated that the call is made from a main building of the company X but the provided current location does not match the address of the main building of the company X. The host may request more information (e.g., GPS location of a calling device, etc.) from the participant to evaluate the provided location information. The host may decide whether the participant can be verified based on the evaluation. As an example, during the evaluation, the host determines that, based in the GPS location of the calling device, the participant is calling from the main building of company X and the provided current location is not accurate.

In addition, the verified location information may be utilized to identify a participant during a conversation. For example, a screen displaying each participant's location information may be provided and when a particular participant speaks, the corresponding location information becomes visually distinguishable within the screen so that the group of people can visually see who is talking from where.

Figure 10:
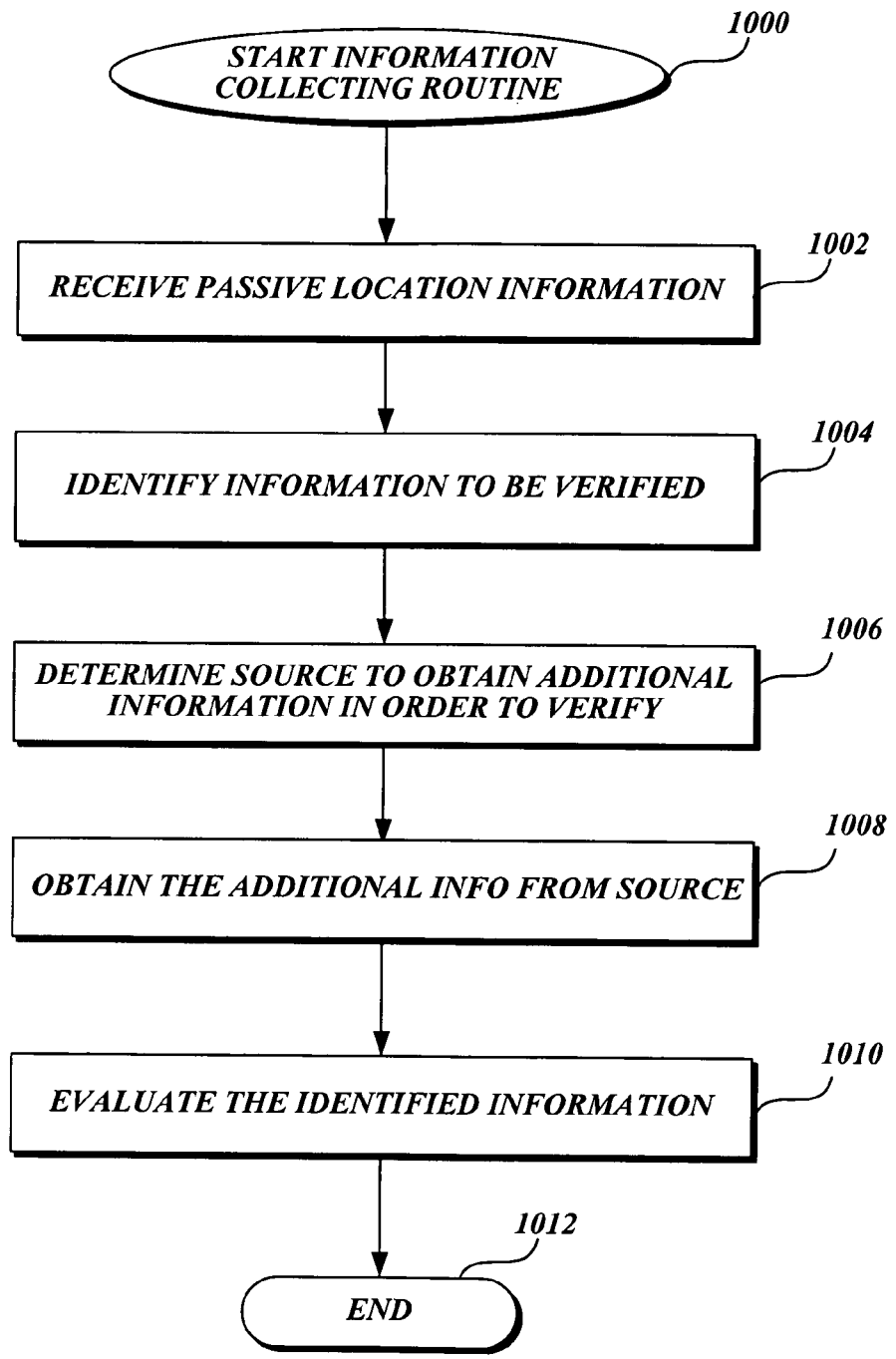
FIG. 10 is a flow diagram illustrating an information collecting routine for receiving and obtaining location information to confirm the location of a caller in accordance with embodiments of the present invention.

Referring to FIG. 10, a flow diagram for location information verifying routine 1000 is depicted in accordance with embodiment of the present invention. At block 1002, passive location information is received as part of contextual information over a digital voice conversation. The passive location information may include location information collected by a calling device, a service provider, or the like during the course of a conversation without a request from a callee. The passive location information may also include caller's location information which is self reported by the caller. At block 1004, part of the passive location information which is to be verified may be identified. As will be appreciated by one of ordinary skill in the art, some of the passive location information can be collected in such a way that no verification is required. For example, some location information which is previously authenticated and encrypted via a third-party service provider may not need to be verified. Such information may be used to evaluate other passive location information. At block 1006, a proper source is identified to obtain the additional information necessary to evaluate the identified passive location information. In one embodiment, part of the passive location information may be used to evaluation other part of the passive location information. For example, call connection routing information, including, but not limited to a router IP address, location and other junctions/connection points along the way between the caller and the service provider may be collected and provided to the callee. The call connection routing information can be used to evaluate the caller's location information. At block 1008, the additional information may be obtained from the source. At block 1010, the passive location information is evaluated based on the obtained additional information and/or previously verified passive location information. The routine 1000 completes at block 1012.

With reference to FIGS. 11A-11E, block diagrams 1100 illustrative of various classes and attributes of structured hierarchies corresponding to VoIP contextual information are shown. As mentioned above, structured hierarchies are predefined organizational structures for arranging contextual information to be exchanged between two or more VoIP devices. Structured hierarchies can be defined, updated, and/or modified by redefining various classes and attributes. The VoIP contextual information exchanged between various VoIP entities (e.g., clients, service providers, etc.) may correspond to a VoIP namespace 1100. In one embodiment, the VoIP namespace 1100 is represented as a hierarchically structured tree of nodes, each node corresponding to a subclass which corresponds to a subset of VoIP contextual information. For example, a VoIP Namespace 1100 may be defined as a hierarchically structured tree comprising a Call Basics Class 1102, a Call Contexts Class 1110, a Device Type Class 1120, a VoIP Client Class 1130 and the like.

Figure 11A:
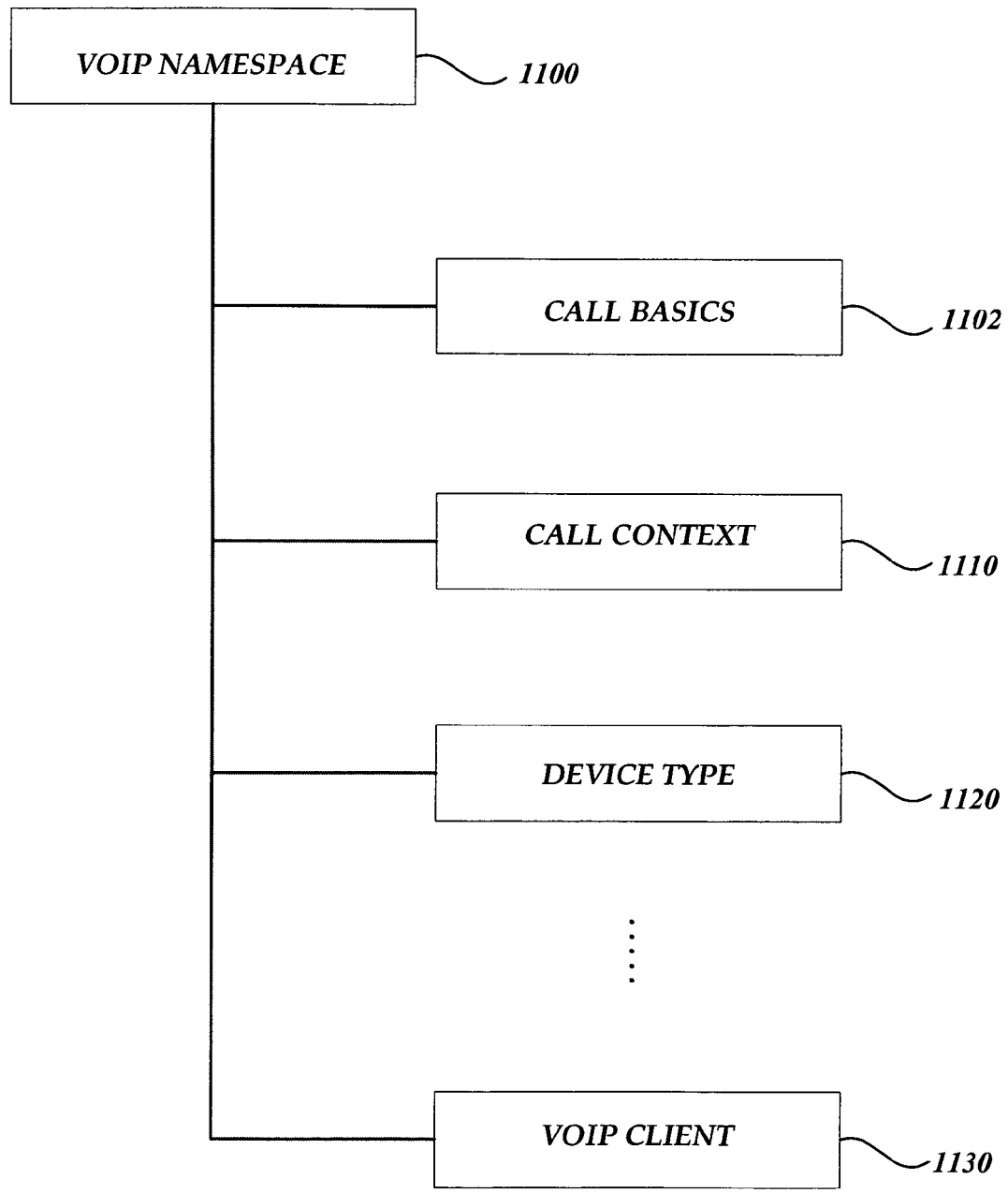
FIGS. 11A-11F are block diagrams illustrative of various attributes and classes of structured hierarchies corresponding to VoIP contextual information in accordance with an aspect of the present invention.
Figure 11B:
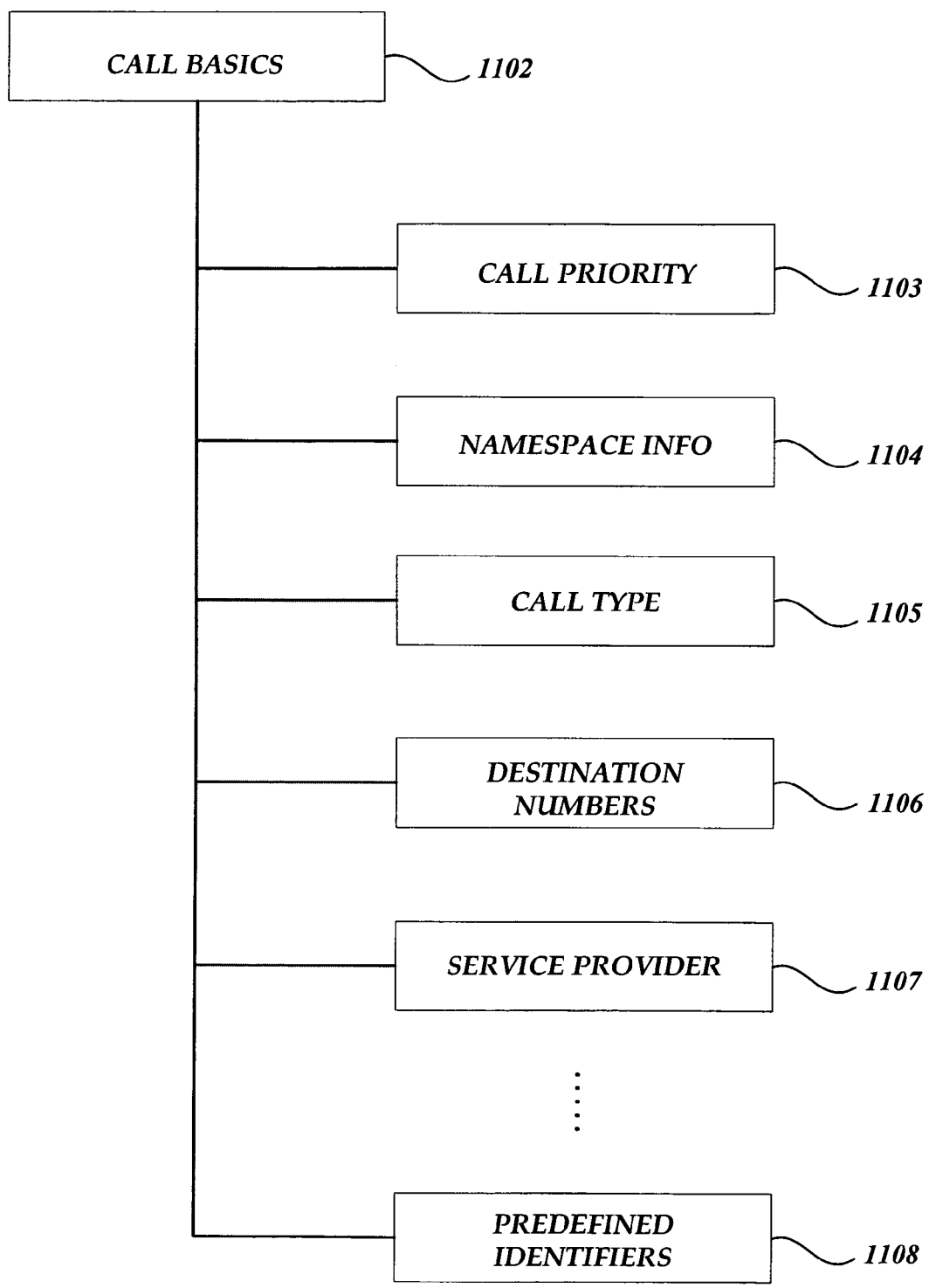

With reference to FIG. 11B, a block diagram of VoIP Namespace 1100 illustrating subclasses of a Call Basics Class 1102 is shown. In an illustrative embodiment, a Call Basics Class 1102 may correspond to a subset of VoIP contextual information relating to a conversation channel connection (e.g., a PSTN call connection, a VoIP call connection, and the like). The subset of the VoIP contextual information relating to a conversation channel connection may include originating numbers (e.g., a caller's client ID number), destination numbers (e.g., callees' client ID numbers or telephone numbers), call connection time, VoIP service provider related information, and/or ISP related information, namespace information, and the like. Additionally, the contextual information relating to a conversation channel connection may include call priority information (which defines the priority levels of the destination numbers), call type information, and the like. The call type information may indicate whether the conversation channel is established for an emergency communication, a broadcasting communication, a computer to computer communication, a computer to POTS device communication, and so forth. In one embodiment, the contextual information relating to a conversation channel connection may include predefined identifiers which represent emotions, sounds (e.g., "ah," "oops," "wow," etc.) and facial expressions in graphical symbols. In one embodiment, a Call Basics Class 1102 may be defined as a subtree structure of a VoIP Namespace 1100, which includes nodes such as call priority 1103, namespace information 1104, call type 1105, destination numbers 1106, service provider 1107, predefined identifiers 1108, and the like.

Figure 11C:
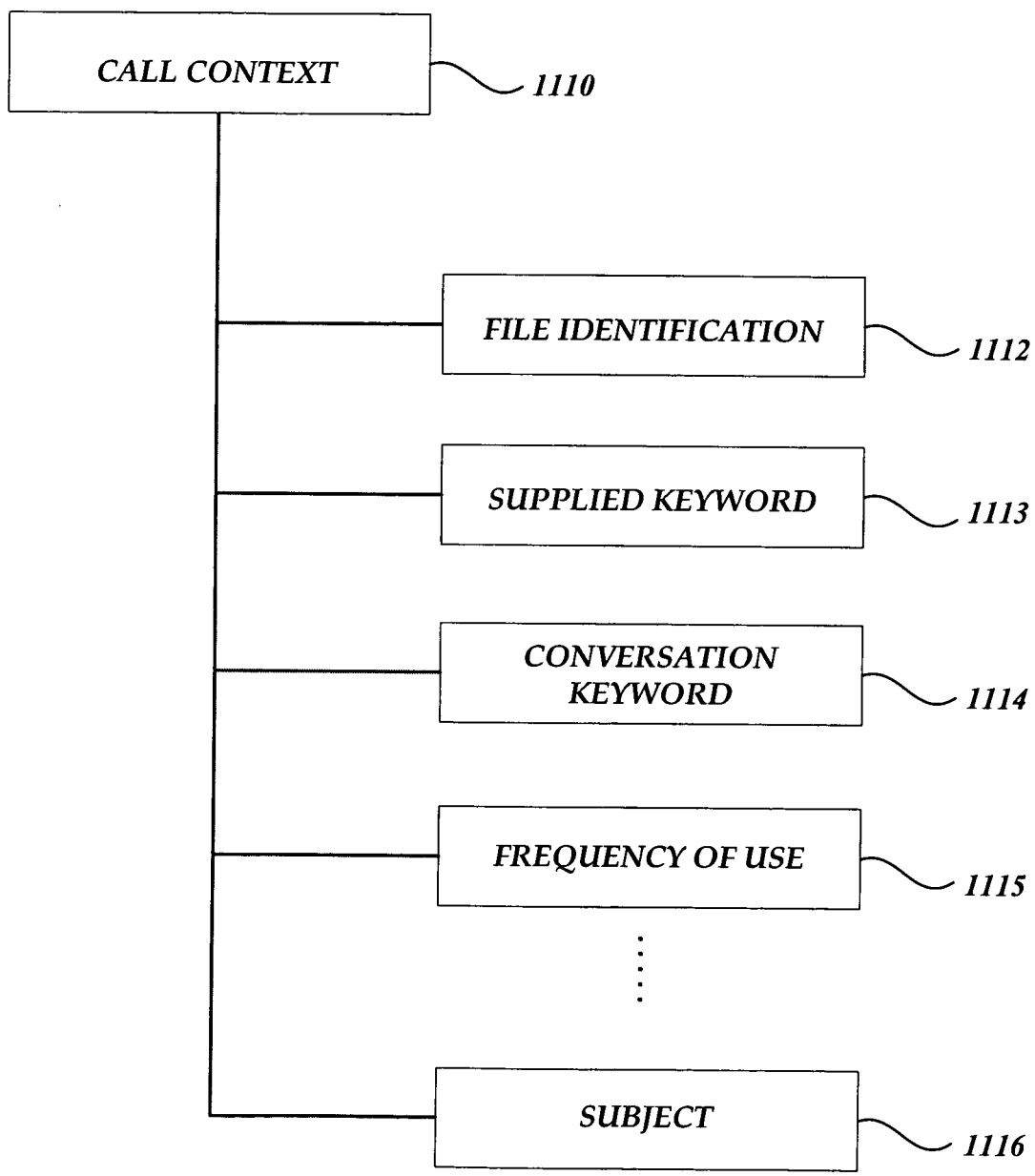

With reference to FIG. 11C, a block diagram of VoIP Namespace 1100 illustrating subclasses of a Call Contexts Class 1110 is shown. In one embodiment, a subset of VoIP contextual information relating to conversation context may correspond to the Call Contexts Class 1110. The contextual information relating to conversation context may include information such as keywords supplied from a client, a service provider, a network, etc. The contextual information relating to conversation context may also include identified keywords from document file data, identified keywords from a conversation data packet (e.g., conversation keywords), file names for documents and/or multimedia files exchanged as part of the conversation, game related information (such as a game type, virtual proximity in a certain game), frequency of use (including frequency and duration of calls relating to a certain file, a certain subject, and a certain client), and file identification (such as a case number, a matter number, and the like relating to a conversation), among many others. In accordance with an illustrative embodiment, a Call Contexts Class 1110 may be defined as a subtree structure of a VoIP Namespace 1100, which includes nodes corresponding to file identification 1112, supplied keyword 1113, conversation keyword 1114, frequency of use 1115, subject of the conversation 1116, and the like.

Figure 11D:
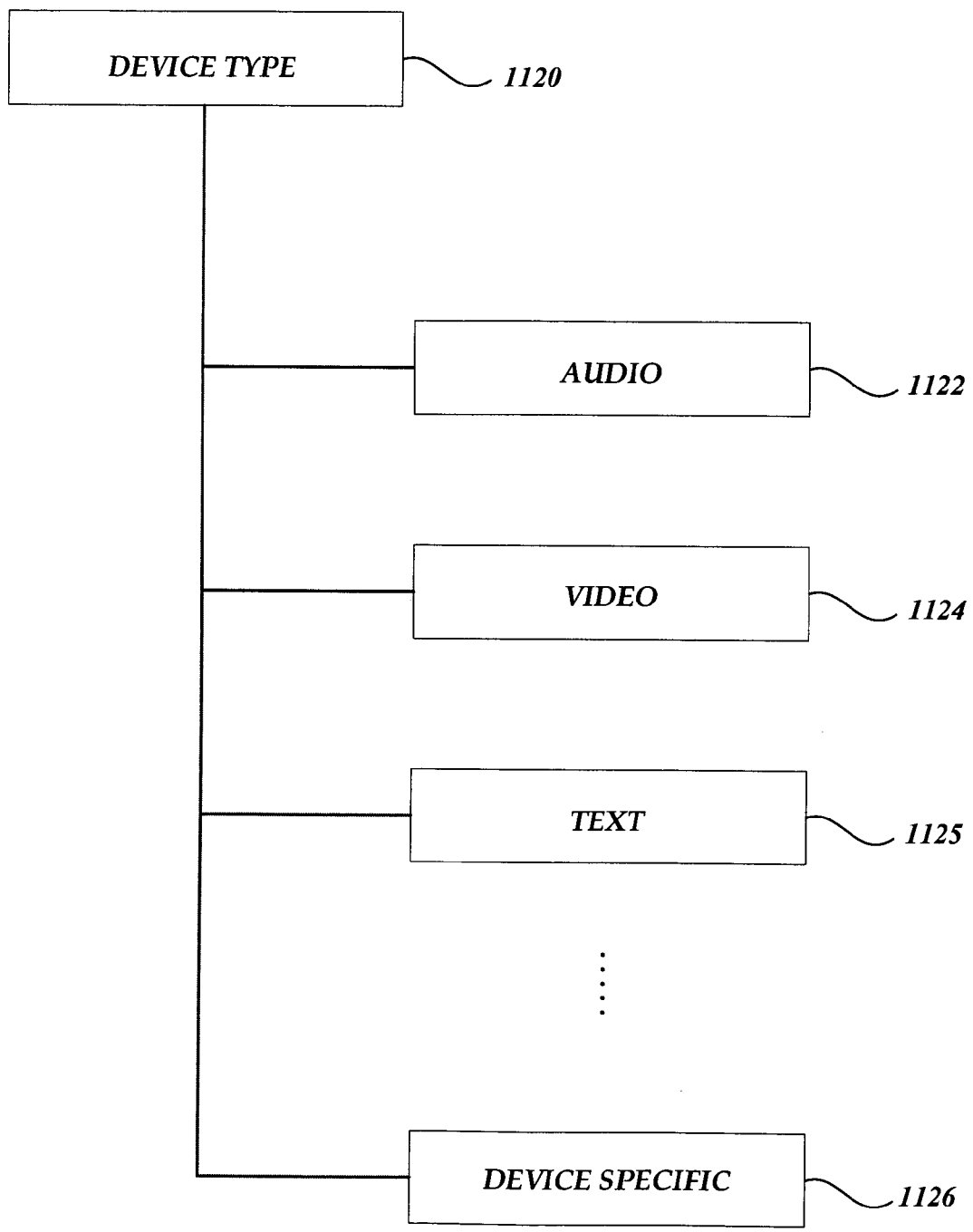

With reference to FIG. 11D, a block diagram of VoIP Namespace 1100 illustrating subclasses of a Device Type Class 1120 is depicted. In one embodiment, a Device Type Class 1120 may correspond to a subset of VoIP contextual information relating to a VoIP client device used for the conversation channel connection. The subset of the VoIP contextual information relating to the VoIP client device may include audio related information which may be needed to process audio data generated by the VoIP client device. The audio related information may include information related to the device's audio functionality and capability, such as sampling rate, machine type, output/input type, microphone, Digital Signal Processing (DSP) card information, and the like. The subset of the VoIP contextual information relating to the VoIP client device may include video related information which may be needed to process video data generated by the VoIP client device. The video related information may include resolution, refresh, type and size of the video data, graphic card information, and the like. The contextual information relating to VoIP client devices may further include other device specific information such as a type of the computer system, processor information, network bandwidth, wireless/wired connection, portability of the computer system, processing settings of the computer system, and the like. In an illustrative embodiment, a Device Type Class 1120 may be defined as a subtree structure of a VoIP Namespace 1100, which includes nodes corresponding to Audio 1122, Video 1124, Text 1125, Device Specific 1126, and the like.

Figure 11E:
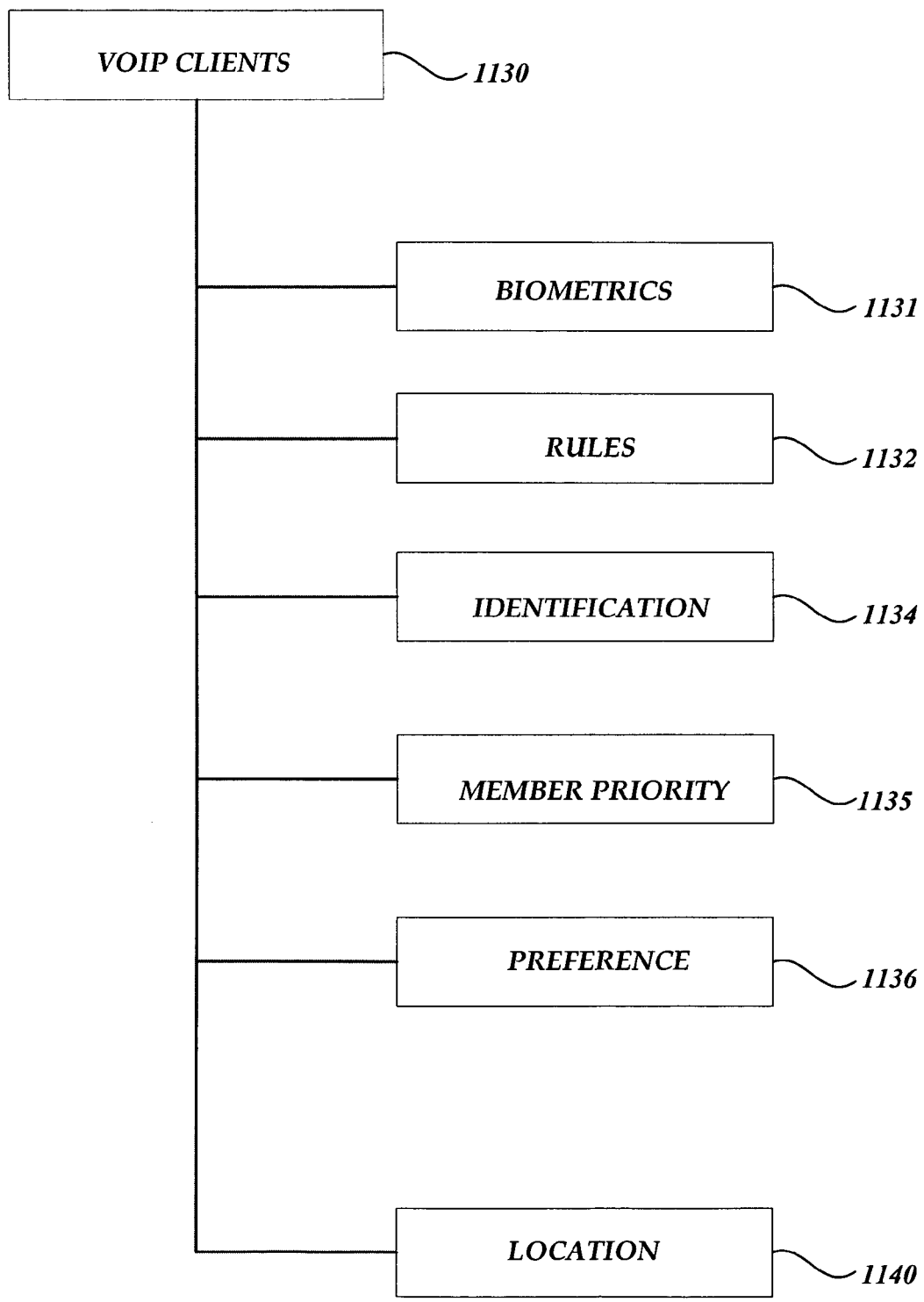

With reference to FIG. 11E, a block diagram of VoIP Namespace 1100 illustrating subclasses of a VoIP Client Class 1130 is depicted. In accordance with an illustrative embodiment, a VoIP Client Class 1130 may correspond to a subset of contextual information relating to VoIP clients. In one embodiment, the subset of the VoIP contextual information relating to the VoIP client may include voice profile information (e.g., a collection of information specifying the tonal and phonetic characteristics of an individual user), digital signature information, and biometric information. The biometric information can include user identification information (e.g., fingerprint) related to biometric authentication, user stress level, user mood, etc. Additionally, the subset of the VoIP contextual information relating to the VoIP client may include location information, assigned phone number, user contact information (such as name, address, company, and the like), rules defined by the client, a service provider, a network, etc., user preferences, digital rights management (DRM), a member rank of an individual user in an organization, priority associated with the member rank, and the like. The priority associated with the member rank may be used to assign priority to the client for a conference call. In one embodiment, a VoIP Client Class 1130 may be defined as a subtree structure of a VoIP Namespace 1100, which includes nodes corresponding to user biometrics 1131, rules 1132, user identification 1134, member priority 1135, client preference 1136, location 1140, and the like.

Figure 11F:
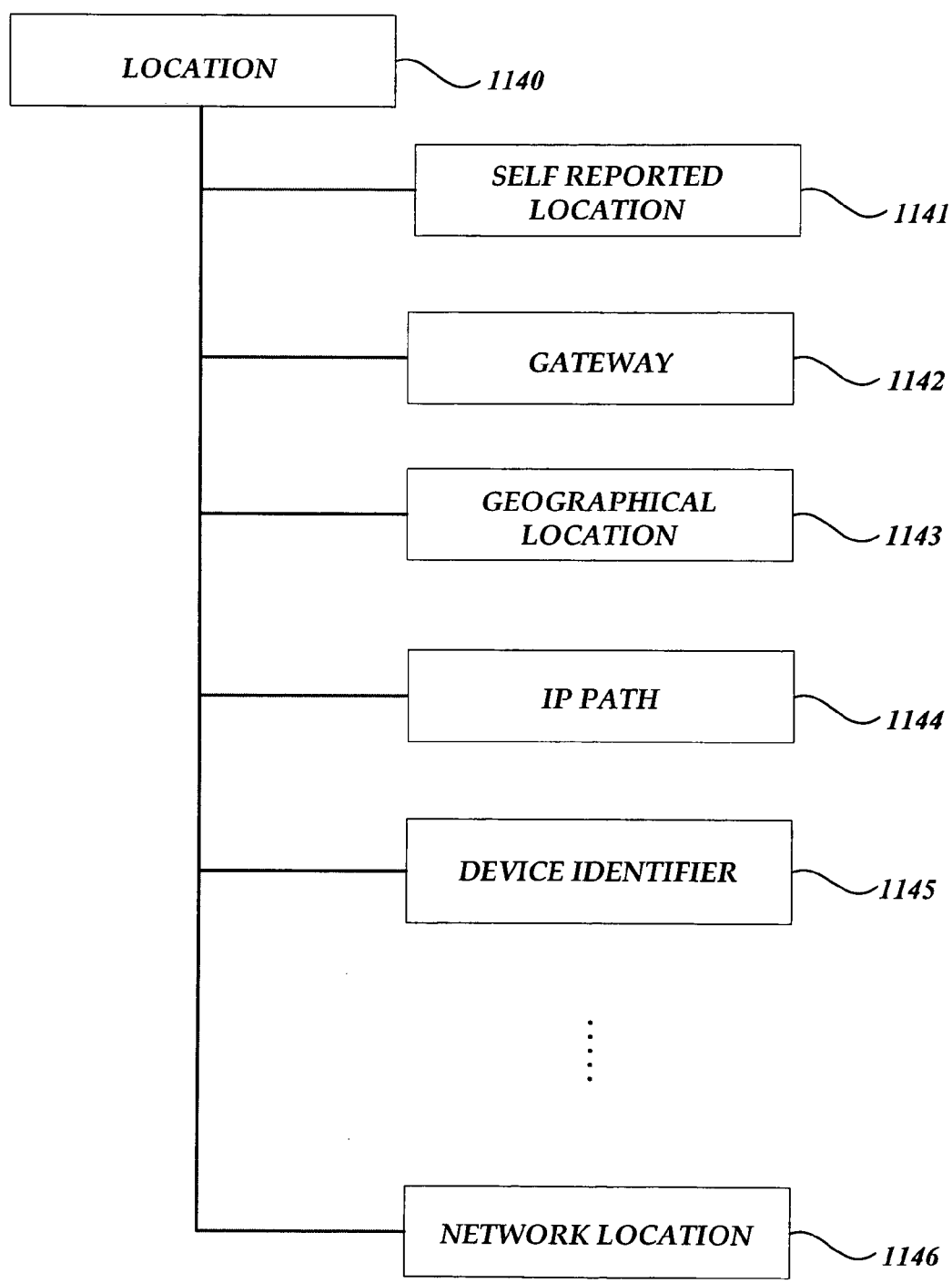

Referring to FIG. 11F, a block diagram of Location Subclass 1140 is depicted. In one embodiment, a Location Subclass 1140 may correspond to a subset of VoIP contextual information relating to location information of a VoIP client, individual user, and/or a device used for a conversation channel connection. As mentioned above, a VoIP client may have registered location information about the VoIP client, which can be provided to other VoIP clients for specified reasons. The subset of the VoIP contextual information relating to the location information may include information relating to a client registered address, a GPS/triangulation location (a geographic location of a particular user, a device, or a client account), a self-reported location of an individual user, network location of a device, etc. The network location information may include an IP address, IP path information, IP trace-back information, gateway information, access point information, and the like. Moreover, a unique device identifier, including, but not limited to, MAC address, Basic Service Set (BSS) identifier, etc. may be utilized to determine the network location of a device. In an illustrative embodiment, a Location Subclass 1140 may be defined as a subtree structure of a VoIP Client 1130, which includes nodes corresponding to Self Reported Location 1141, Gateway Information 1142, Geographical Location 1143, IP Path Information 1144, Device Identifier 1145, Network Location 1146, and the like.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for collecting information about a location of a calling device to verify a calling party in response to a call connection request for establishing a digital communication channel, comprising:
   during a connection set-up phase to establish a digital communication channel with the calling device that is used to exchange contextual information and voice information that occurs before establishing the digital communication channel for voice communication, performing operations comprising:
   receiving a call connection request from a calling device to establish the digital communication channel;
   receiving contextual information comprising a first set of location information from the calling device;
   obtaining a second set of location information that is necessary for verifying the first set of location information;
   evaluating the first set of location information by comparing it with the second set of location information in order to authenticate an identity of the calling party, wherein if the identity of the calling party is not authenticated within a satisfactory degree of certainty, rejecting the call connection request to establish the digital communication channel;
   presenting information including location information on a display that is used by a callee for accepting/rejecting a call from the caller;
   wherein the contextual information is exchanged during the connection set-up phase of the digital communication channel;
   after receiving the call connection request, requesting call connection routing information in addition to the first set of location information from the calling party comprising: a router IP address, connection points between the calling device and a service provider, a device unique identifier, and IP trace-back information; and
   establishing the digital communication with the caller for the voice communication when determined.

2. The method of claim 1, wherein evaluating includes transmitting a request for more information relating to a location from the calling party.

3. The method of claim 2, further comprising:
   receiving a response to the request from the calling party and verifying the response.

4. The method of claim 1, wherein the first set of location information is location information voluntarily reported by the calling party.

5. The method of claim 1, wherein the first set of information is basic location information automatically collected by the calling device at the time of the call connection request for establishing a digital communication channel.

6. The method of claim 1, wherein the second set of location information is authenticated location information.

7. The method of claim 1, wherein the second set of location information is securely encrypted.

8. A computer-readable storage medium not including signals having computer executable instructions encoded thereon for confirming a caller's identity via location information exchanged over a digital voice conversation when executed, comprising:
- during a connection set-up phase to establish a call with the caller that occurs before establishing the digital voice conversation receiving identity information from a caller as part of a digital voice conversation;
- receiving a call connection request from the caller to establish the digital voice conversation;
- identifying location information necessary to verify the identity information and requesting the identified location information from the caller;
- after obtaining the identified location information from the caller over the digital voice conversation, confirming the identity information by verifying the identified location information obtained from the caller, wherein if the identity of the calling party is not confirmed within a satisfactory degree of certainty, rejecting the call connection request to establish the digital communication channel;
- presenting information including location information on a display for accepting/rejecting a call from the caller;
- after receiving the call connection request, requesting call connection routing information in addition to the location information from the caller comprising one or more of: a router IP address, connection points between the caller and a service provider, a device unique identifier, and IP trace-back information; and
- establishing the digital voice conversation with the caller.

9. The computer readable storage medium of claim 8, further comprising obtaining additional information for verifying the identified location information obtained from the caller and wherein the additional information is trusted.

10. The computer readable storage medium of claim 9, wherein the identity information is confirmed if the identified location information obtained from the caller corresponds to the additional information.

11. The computer readable storage medium of claim 10, wherein a unique identification of a calling device is used to determine if the identified location information obtained from the caller corresponds to the additional information.

12. The computer readable storage medium of claim 10, wherein geographic location information of a calling device is used to determine if the identified location information obtained from the caller corresponds to the additional information.

13. The computer readable storage medium of claim 10, wherein network path information of a calling device is used to determine if the identified location information obtained from the caller corresponds to the additional information.

14. A method for collecting information about a location of a calling device to verify a calling party in response to a call connection request for establishing a digital communication channel, comprising:
- during a connection set-up phase to establish a digital communication channel with the calling device that is used to exchange contextual information and voice information that occurs before establishing the digital communication channel for voice communication, performing operations comprising:
- receiving a call connection request from a calling device to establish the digital communication channel;
- receiving contextual information comprising a first set of location information from the calling device;
- obtaining a second set of location information that is necessary for verifying the first set of location information;
- evaluating the first set of location information by comparing it with the second set of location information in order to authenticate an identity of the calling party, wherein:
  - when the identity of the calling party is not authenticated within a satisfactory degree of certainty, rejecting the call connection request to establish the digital communication channel; and
  - if the identity of the calling party is authenticated within a satisfactory degree of certainty, accepting the call connection request for establishing a digital communication channel;
- presenting information including location information on a display that is used by a callee for accepting/rejecting a call from the caller;
- wherein the contextual information is exchanged during the connection set-up phase of the digital communication channel;
- after receiving the call connection request, requesting call connection routing information in addition to the first set of location information from the calling party comprising: a router IP address, connection points between the calling device and a service provider, a device unique identifier, and IP trace-back information; and
- establishing the digital communication with the caller for the voice communication when determined.

15. The method of claim 14, wherein after accepting the call connection request for establishing a digital communication channel, the calling party is periodically authenticated.

16. The method of claim 14, wherein evaluating includes transmitting a request for more information relating to a location from the calling party.

17. The method of claim 16, further comprising:
- receiving a response to the request from the calling party and verifying the response.

18. The method of claim 14, wherein the first set of location information is location information voluntarily reported by the calling party.

19. The method of claim 14, wherein the first set of information is basic location information automatically collected by the calling device at the time of the call connection request for establishing a digital communication channel.

20. The method of claim 14, wherein the second set of location information is authenticated location information.

* * * * *